US011316675B2

(12) United States Patent
Sibson

(10) Patent No.: US 11,316,675 B2
(45) Date of Patent: Apr. 26, 2022

(54) OPTICAL INTERFEROMETER APPARATUS AND METHOD

(71) Applicant: KETs Quantum Security Ltd, Bristol (GB)

(72) Inventor: Philip Sibson, Bristol (GB)

(73) Assignee: Kets Quantum Security LTD, Bristol (GB)

(*) Notice: Subject to any disclaimer, the term of this patent is extended or adjusted under 35 U.S.C. 154(b) by 203 days.

(21) Appl. No.: 16/330,163

(22) PCT Filed: Sep. 5, 2017

(86) PCT No.: PCT/GB2017/052570
§ 371 (c)(1),
(2) Date: Mar. 4, 2019

(87) PCT Pub. No.: WO2018/042203
PCT Pub. Date: Mar. 8, 2018

(65) Prior Publication Data
US 2019/0190708 A1   Jun. 20, 2019

(30) Foreign Application Priority Data
Sep. 5, 2016 (GB) ..................... 1615032

(51) Int. Cl.
H04B 10/70 (2013.01)
H04B 10/548 (2013.01)
H04L 9/08 (2006.01)

(52) U.S. Cl.
CPC ......... H04L 9/0852 (2013.01); H04B 10/548 (2013.01); H04B 10/70 (2013.01)

(58) Field of Classification Search
CPC ...... H04B 10/548; H04B 10/70; H04L 9/0852
(Continued)

(56) References Cited

U.S. PATENT DOCUMENTS

2009/0071125 A1* 3/2009 Yoshida ............... F02D 41/146
60/286
2009/0074425 A1* 3/2009 Tanaka ............... H04B 10/5053
398/185

(Continued)

FOREIGN PATENT DOCUMENTS

GB         2536248 A        9/2016

OTHER PUBLICATIONS

Reed et al.; High-speed carrier-depletion silicon Mach-Zehnder optical modulators with lateral PN junctions; Frontiers in Physics; Dec. 2014; pp. 1-5. (Year: 2014).*

(Continued)

Primary Examiner — Amritbir K Sandhu
(74) Attorney, Agent, or Firm — Kilpatrick Townsend & Stockton LLP

(57) ABSTRACT

There is presented optical interferometer apparatus for generating at least a first and a second state for each of at least two different quantum cryptographic basis sets and associated methods for operating the apparatus. First and a second interferometer arm paths and at least two interferometer output paths are provided. Each of the first and second interferometer arm paths; and the first and second optical output paths comprises a controllable phase modulator for controllably changing the phase of light propagating along the respective paths. This maybe a silicon carrier depletion phase modulator. The output from the controllable phase modulators of the first and second optical output paths are used together for defining each of the first and second states for each respective basis set. In some examples at least one of the interferometer arm paths comprises a further controllable phase modulator such as a thermo-optic phase modulator.

20 Claims, 15 Drawing Sheets

(58) Field of Classification Search
USPC .................................. 380/44; 398/115–117
See application file for complete search history.

(56) References Cited

U.S. PATENT DOCUMENTS

| | | | | |
|---|---|---|---|---|
| 2011/0280405 | A1* | 11/2011 | Habif | H04L 9/0858 380/278 |
| 2016/0234017 | A1* | 8/2016 | Englund | H04B 10/0795 |
| 2016/0234018 | A1* | 8/2016 | Frohlich | H04L 9/0852 |
| 2018/0062838 | A1* | 3/2018 | Godfrey | H04L 9/0858 |
| 2019/0013878 | A1* | 1/2019 | Paraiso | G02F 1/225 |

OTHER PUBLICATIONS

Sibson et al; Chip-based Quantum Key Distribution; Centre for Quantum Photonics, H,H. Wills Physics Laboratory and Department of Electrical and Electronic Engineering, Sep. 2015; pp. 1-5. (Year: 2015).*

De Gruyter et al.; Recent breakthroughs in carrier depletion based silicon optical modulators; 2014; Nanophotonics vol. 3 Issue 4-5; pp. 1-36. (Year: 2014).*

Cai et al.; A silicon photonic transceiver circuit for high-speed polarization based discrete variable quantum key distribution; 2017; Optical society of America; pagers 1-12. (Year: 2017).*

Sibson et al; Chip-based quantum key distribution; Feb. 2017, Nature Communications, pp. 1-6. (Year: 2017).*

Silverstone, J. et al., Silicon Quantum Photonics, IEEE Journal of Selected Topics in Quantum Electronics, 22(6):6700113 (2016) (13 pages).

GB 1615032.8, Examination Report, dated Apr. 29, 2021.

PCT Application No. PCT/GB2017/052570, International Search Report and Written Opinion, dated Jan. 8, 2018, 11 pages.

GB Application No. 1615032.8 , "Search Report Under Section 17(5)", dated Feb. 28, 2017, Feb. 28, 2017, 4 pages.

Erven et al., "Chip-scale integrated quantum technologies", 2015 Photonics North, IEEE, Jun. 9, 2015, 1 pages.

* cited by examiner

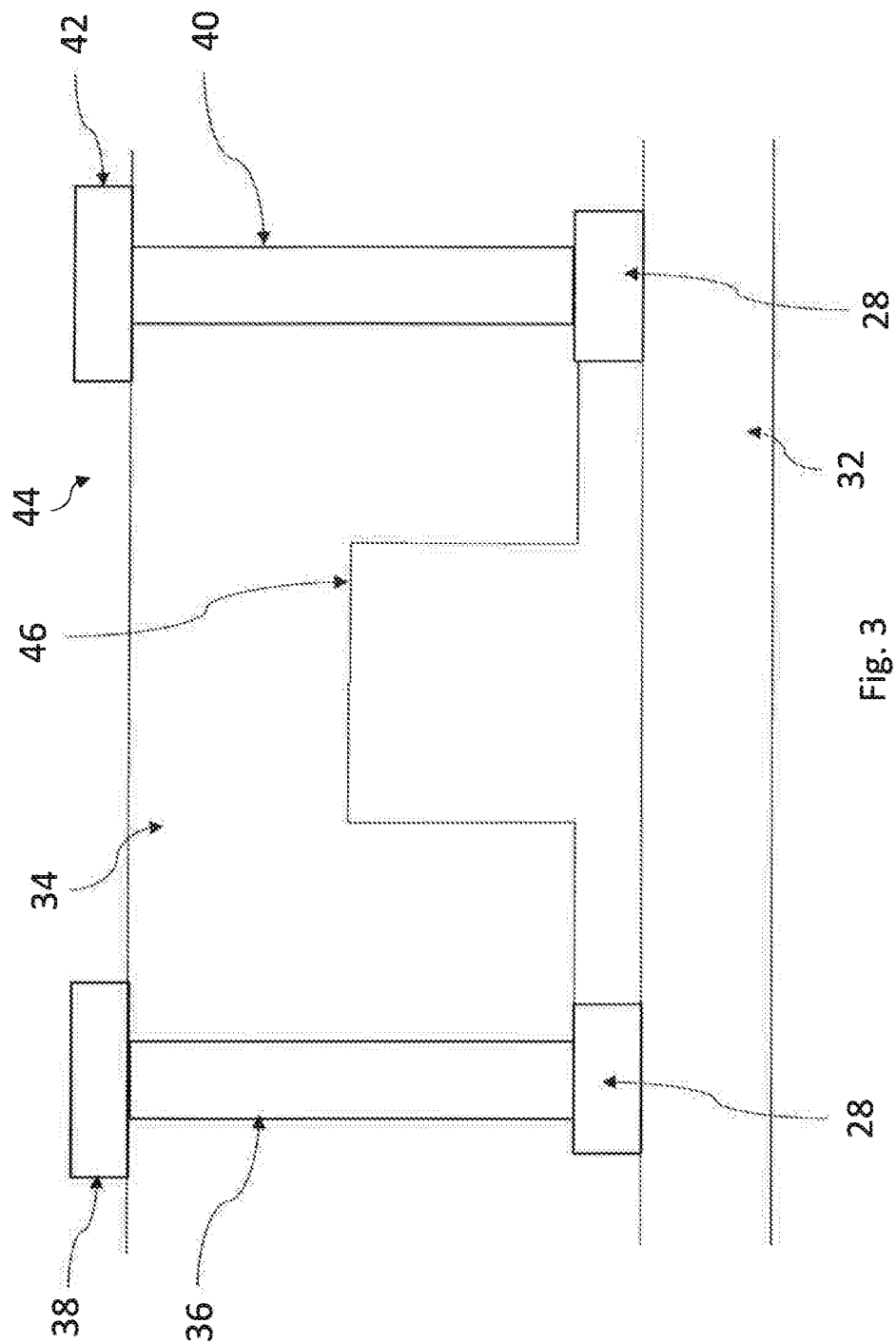

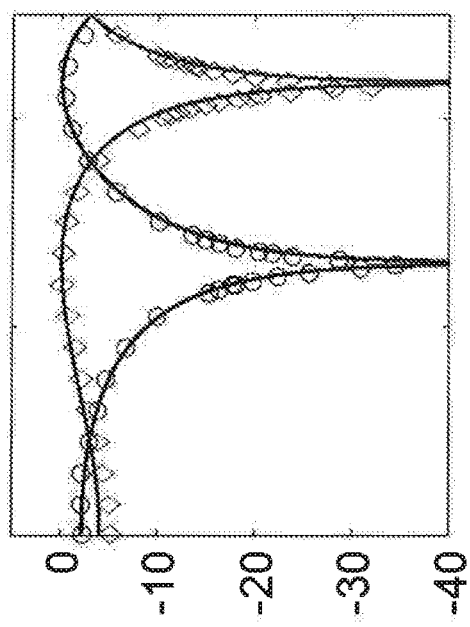 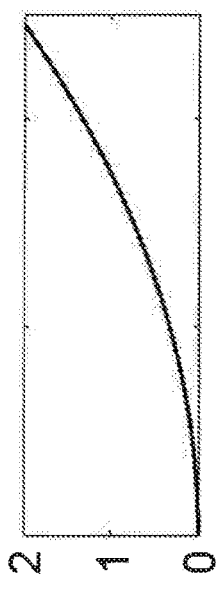 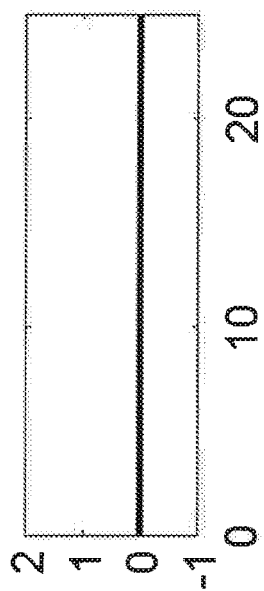
Fig. 4a  Fig. 4b  Fig. 4c
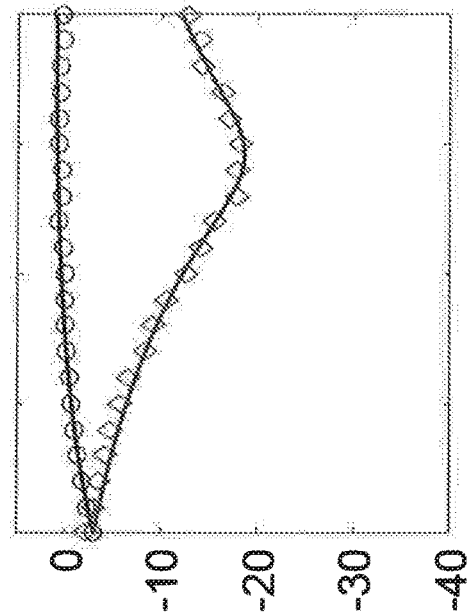 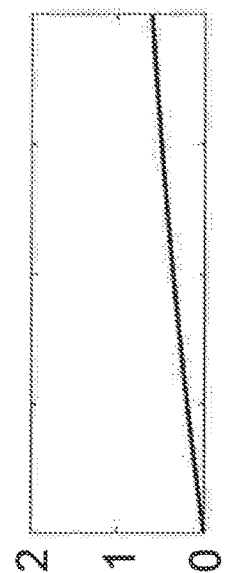 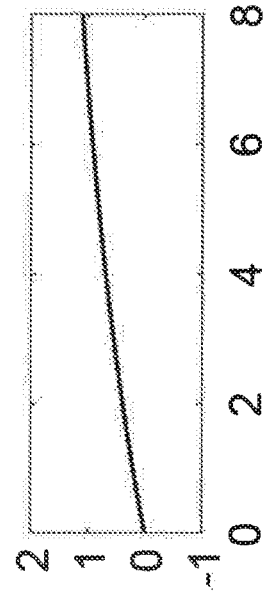
Fig. 5a  Fig. 5b  Fig. 5c

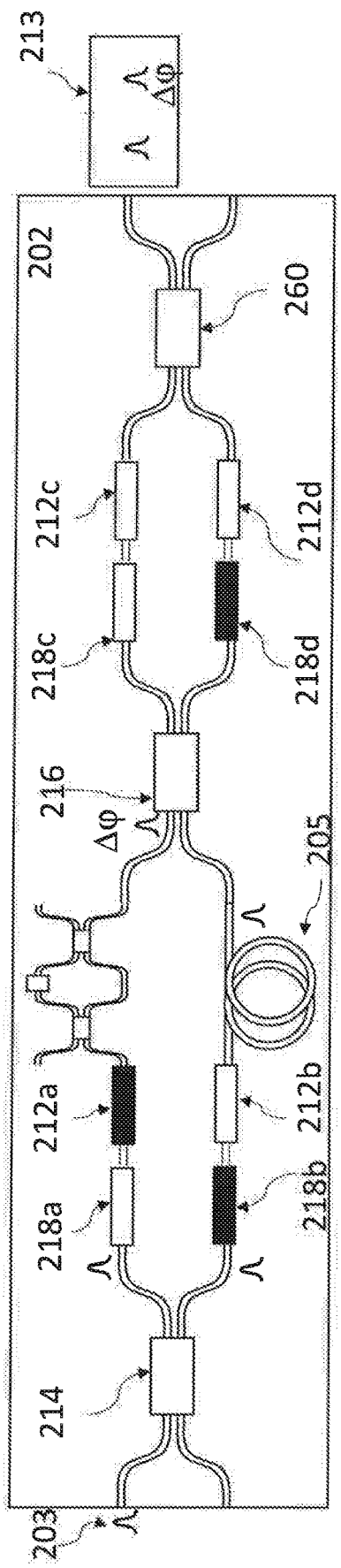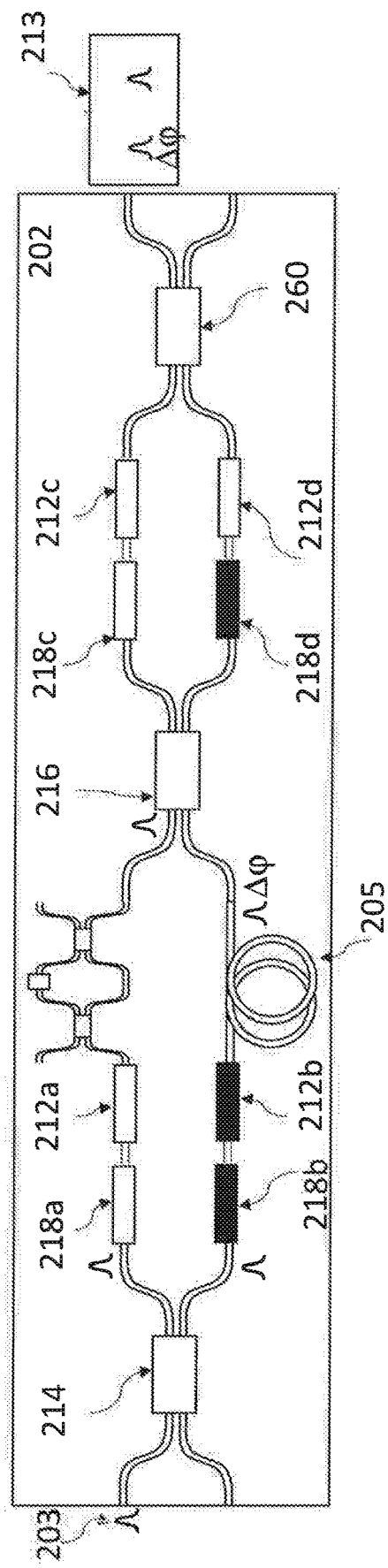

OPTICAL INTERFEROMETER APPARATUS AND METHOD

FIELD

The present invention is in the field of optical interferometer apparatus, in particular, but not exclusively, optical interferometers for quantum cryptographic key generation.

BACKGROUND

Information security is becoming increasingly relevant in modern day society particularly where information is shared over communication channels. In order to prevent unwanted eavesdroppers intercepting information, several forms of encrypted communications have arisen. Cryptography is the field of encoding a message so that only the intended person or end user can successfully read the message.

Traditional public-key cryptographic systems of encoding often involve making it difficult, but not impossible, for an eavesdropper to decode the message due to the difficulty of factorising large numbers or other mathematical problems. These traditional encryption techniques however are difficult to break rather than being inherently secure. If a technique to efficiently factorise large numbers is developed then messages using such traditional encryption techniques may be subject to security breaches.

The field of quantum cryptography uses the principles of quantum mechanics and aims to overcome some of the inherent deficiencies in traditional cryptography systems by providing a reliable way of transmitting a secret key and detecting the presence of a potential eavesdropper along the way. The sharing of the secret key is often termed as Quantum Key Distribution (QKD). Several QKD schemes are known and are roughly divided into two categories, those that rely on the quantum mechanical principle of measuring single particles and those that rely on the quantum properties of entangled states.

Several different quantum cryptographic techniques (often called protocols) exist that enable the creation and exchange of a secure key wherein each technique is configured to generate the key data and provide a methodology or means to ensure the secrecy of the key. Examples of protocols include the Bennett-Brassard 84 (BB84) protocol, the Coherent One Way (COW) protocol, the Differential Phase Shift (DPS) protocol and the Reference Frame Independent (RFI) protocol.

Typical terminology in quantum cryptographic techniques include the sender or transmitting party A (or 'Alice'), the receiving party B (or 'Bob') and an unwanted eavesdropper E (or 'Eve'). To securely communicate with each other, Alice and Bob take steps to set up a secret key between each other that is used to encode the data they wish to transmit to each other.

Quantum cryptographic techniques use at least one basis, wherein each basis defines at least two data values transmitted between Alice and Bob to set up the secret key. Therefore, the bases used by the transmitter and receiver to generate the key may arise from using different quantum cryptographic protocols. Each protocol uses at least one basis. Each basis has at least two data values wherein each data value is derived using degrees of freedom of light pulses, for example by comparing two spatially or time separated light pulses. Each pulse is allocated to a pulse 'bin'; wherein different pulse bins are either separated in time (for example one bin being sent after another bin) and/or space (for example one bin being sent in a different spatial path to the other bin). In some protocols the data value of the bases are derived from the presence of one pulse in one bin and no pulse in another bin.

Some protocols such as BB84 use separate sets of two pulses to define the data value in each basis, whereas some protocols, such as DPS, may use the same pulse to help define two different data values in the same basis.

The set of pulse states for each data value are sent by Alice and subsequently received by Bob. Bob compares the set of two pulse states defining the data value and outputs an optical state that corresponds to the data value. The set of pulse states for each data value are configured such that, when compared and decoded into an output state, the optical output state of the data values are orthogonal eigenstates.

The optical states in each data value of each basis differ from each other by at least one optical degree of freedom (i.e. a degree of freedom in the properties of the optical pulse).

When setting up a quantum key, Alice sends Bob a sequence of optical pulses in accordance with a particular protocol. Bob receives the pulses and measures them in accordance with the same protocol. Typically, and desirably, the non-zero pulses states sent by Alice have a low mean photon number below one, such that the chance of Alice sending pulses with multiple photons is low to negligible. The ability to send single photon pulses is important in QKD because multiple photon pulses can weaken the security of the key when using weak coherent sources. For weak coherent sources (such as an attenuated laser) mean photon numbers of less than 0.1 are usually used to eliminate multiphoton terms. Other optical sources may be used such as quantum dot sources which more reliably emit single photon pulses and do not suffer from multiple photon terms, therefore may have higher mean photon numbers such as $\mu$ less than 1.

Once Bob has performed a measurement on the pulses sent by Alice, Alice and Bob communicate through a classical channel to establish which bits of Alice's initially transmitted data are to be used to generate the quantum key. Often this requires sending a subset of the data values measured by Bob. The further steps in creating the quantum key shared between Alice and Bob may be according to any suitable technique selecting which of received data values to use to set-up the key. This can include but be, for example, error estimation, error correction or reconciliation, and privacy amplification to ensure security.

In certain protocols, for example BB84, multiple bases are used to define the data values, such as data values of 0 and 1 using a first basis and data values of 0 and 1 using another basis. Mathematically these four states of the two basis sets are often respectively termed 0, 1 and +,−.

Each basis has its own way of encoding the data values 0 and 1 using one or more pulses, for example in BB84, some bases use the phase difference between two sequential non-zero intensity pulses to define the data values of 0 and 1 whilst another basis uses the relative order of sending a zero intensity and a non-zero intensity pulse define the data values of 0 and 1. In a typical implementation of BB84, Alice will send data using a random selection of either basis for each data value sent. Bob can typically only measure sets of pulses according to one of the bases at any time. Therefore, because Bob does not know which basis to correctly measure in, Bob may measure sets of pulses correctly or incorrectly. In BB84, when Bob uses the correct basis to measure the data values from two pulse states, the output optical state signifying the data value (if sent back to Alice) will be in accordance with the known data value sent by Alice. If however Bob uses the wrong basis to measure the pulse states then the output optical state will be random. The correct and incorrect measurement bases used by Bob form part of the procedure used to generate the key and establish the presence of eavesdroppers.

Previous works have tried to address making quantum key generating devices operate in the GHz range wherein light pulses that are used to generate the key have an input pulse repetition rate of 1-2 GHz or more. Previous works have used $LiNbO_3$ or InP modulators using the electro-optic effect ($\chi^2$ nonlinearity). Whilst being able to operate at speeds in the GHz range, these material systems are often difficult to manufacture and have to be formed as separate chips that are then optically aligned with other components of the set-up. This alignment adds to manufacturing complexity. Another issue with these $\chi^2$ nonlinearity material systems is they are not easily integrated with standard electronics platforms, for example silicon electronics.

Some previous works to create different states of a quantum cryptographic basis set have used silicon carrier injection phase modulators in the interferometer arms between a splitter and a combiner. An issue with carrier injection modulators is that when more carriers are injected, by increasing the voltage, the transmission of the modulator starts decreasing because the increased number of free carriers increases the amount of light absorbed through the semiconductor. The maximum speed at which the carrier injection phase modulators can operate also depends on the carrier lifetime of the device. Furthermore, the reduced transmission of the carrier injection phase modulators in the interferometer arms impacts the ability of the interferometer to output states of light with high extinction ratios between the two interferometer output ports. Silicon optical interferometers have also been used for other purposes apart from generating states for a quantum cryptographic basis set, therefore these issues may also apply to other systems.

SUMMARY

According to a first aspect of the invention, there is provided an optical interferometer apparatus for generating at least a first and a second state for each of at least two different quantum cryptographic basis sets, the apparatus comprising: at least a first and a second interferometer arm path that are spatially separate from each other; and, at least two interferometer output paths that are spatially separate from each other; wherein each of: the first and second interferometer arm paths; and, the first and second optical output paths; comprises a controllable phase modulator configured to controllably change the phase of light propagating along the respective path; wherein the output from the controllable phase modulators of the first and second optical output paths are used together for defining each of the first and second states for each respective basis set.

The first aspect may be modified in any suitable way as disclosed herein including but not limited to any one or more of the following.

The optical interferometer apparatus may be configured such that at least one of the said phase modulators comprises a silicon phase modulator.

The optical interferometer apparatus may be configured such that at least one of the said phase modulator comprises a carrier depletion phase modulator.

The optical interferometer apparatus may be configured such that each of the said phase modulators comprises a silicon carrier depletion phase modulator.

The optical interferometer apparatus may be configured such that at least one of the interferometer arm paths comprises a further controllable phase modulator of a different type than the silicon carrier depletion phase modulator.

The optical interferometer apparatus may be configured such that the further controllable phase modulator comprises a thermo-optic phase modulator.

The optical interferometer apparatus may be configured such that the optical interferometer comprises an integrated optic interferometer.

The optical interferometer apparatus may be configured such that the optical interferometer comprises a silicon integrated optic interferometer.

The optical interferometer apparatus may comprise: an optical splitter configured to: receive input light; and, output the received input light upon the first interferometer arm path and the second interferometer arm path, an optical combiner configured to: receive light from any of the first and second interferometer arm paths; output light upon the first and second interferometer output paths.

The optical interferometer apparatus may be configured such that the optical path lengths of the first and second arm paths are substantially the same.

According to a second aspect of the present invention, there is presented an optical interferometer apparatus comprising: at least a first and a second interferometer arm path that are spatially separate from each other; and, at least two interferometer output paths that are spatially separate from each other; wherein each of: the first and second interferometer arm paths; and, the first and second optical output paths: comprises a controllable phase modulator; at least one of the said controllable phase modulators comprising a controllable carrier depletion phase modulator configured to controllably change the phase of light propagating along the respective path.

According to a third aspect of the present invention there is presented an optical interferometer apparatus comprising: at least a first and a second interferometer arm path that are spatially separate from each other; and, at least two interferometer output paths that are spatially separate from each other; wherein each of: the first and second interferometer arm paths; and, the first and second optical output paths; comprises a controllable phase modulator; at least one of the said controllable phase modulators comprising a controllable silicon charge carrier density phase modulator configured to controllably change the phase of light propagating along the respective path.

The second and third aspect may be modified in any suitable way as disclosed herein including but not limited to any one or more of the following.

The optical interferometer apparatus may be configured such that at least one of the said phase modulator comprises a silicon carrier depletion phase modulator.

The optical interferometer apparatus may be configured such that each of the said controllable phase modulators comprises a silicon carrier depletion phase modulator.

The optical interferometer apparatus may be configured such that at least one of the interferometer arm paths comprises a further controllable phase modulator of a different type than the silicon carrier depletion phase modulator.

The optical interferometer apparatus may be configured such that the further controllable phase modulator comprises a thermo-optic phase modulator.

The optical interferometer apparatus may be configured such that the optical interferometer comprises an integrated optic interferometer.

The optical interferometer apparatus may be configured such that the optical interferometer comprises a silicon integrated optic interferometer.

The optical interferometer apparatus may comprise: an optical splitter configured to: receive input light; and, output the received input light upon the first interferometer arm path and the second interferometer arm path, an optical combiner configured to: receive light from any of the first and second interferometer arm paths; output light upon the first and second interferometer output paths.

The optical interferometer apparatus may be configured such that the optical path lengths of the first and second arm paths are substantially the same.

According to a fourth aspect of the present invention there is presented an integrated optic interferometer apparatus for generating at least a first and a second state for each of two quantum cryptographic basis sets, the apparatus comprising: at least a first and a second interferometer arm path that are spatially separate from each other; and, at least two interferometer output paths that are spatially separate from each other; wherein each of: the first and second interferometer arm paths; and, the first and second optical output paths; comprises a controllable silicon carrier depletion phase modulator configured to controllably change the phase of light propagating along the respective path; wherein the output from the controllable phase modulators of the first and second optical output paths are used together for defining each of the first and second states for each respective basis set; wherein at least one of the optical interferometer arm paths comprises a thermo-optic controllable phase modulator.

The fourth aspect may be modified in any suitable way as disclosed herein including but not limited to any one or more of the following.

The integrated optic interferometer apparatus as claimed in claim 21 comprising: an optical splitter configured to: receive input light; and, output the received input light upon the first interferometer arm path and the second interferometer arm path, an optical combiner configured to: receive light from any of the first and second interferometer arm paths; output light upon the first and second interferometer output paths.

According to a fifth aspect of the present invention there is presented an optical interferometer apparatus for generating at least a first and a second state for a quantum cryptographic basis set, the apparatus comprising: at least a first and a second interferometer arm path that are spatially separate from each other; and, at least two interferometer output paths that are spatially separate from each other; wherein at least one of: the first and second interferometer arm paths; and, the first and second optical output paths; comprises a controllable carrier depletion phase modulator configured to controllably change the phase of light propagating along the respective path; wherein at least one of the optical interferometer arm paths comprises a thermo-optic controllable phase modulator; wherein the output from the controllable phase modulators of the first and second optical output paths are used together for defining each of the first and second states for the basis set.

The fifth aspect may be modified in any suitable way as disclosed herein.

The interferometer apparatus as presented in any of the above aspects may also be configured according to one or more of the following The interferometer apparatus may be configured such that the controllable phase modulators are silicon integrated optic carrier depletion phase modulators having a length, along the direction of optical propagation, between 0.5 mm-5 mm.

The interferometer apparatus may be configured such that the said controllable phase modulators in each of the said paths have a speed of 100 kHz-50 GHz.

The interferometer apparatus may be configured such that the said controllable phase modulators in each of the arm paths and output paths have a speed of 100 MHz-15 GHz.

The interferometer apparatus may be configured such that the interferometer comprises a silicon integrated optic interferometer have one or more silicon integrated optic waveguides.

The interferometer apparatus may be configured such that the first and second optical output paths are input into a polarization rotator combiner.

The interferometer apparatus may be configured such that the polarization rotator combiner is configured to: receive light from the first and second optical output paths in a first plane; and, output the said light in a direction out of the said plane.

The interferometer apparatus may be configured such that the polarization rotator combiner comprises a grating.

The interferometer apparatus may be configured such that: the first and second output paths are input into a second optical combiner; the apparatus is configured such that one of: the first interferometer arm path is longer than the second interferometer arm path; or, the length of first output path between the first and second optical combiner is longer than the second output path between the first and second combiner.

The interferometer apparatus may be configured such that the shorter of the said paths comprises a controllable optical attenuator.

According to a sixth aspect of the present invention there is presented a method of operating the integrated optic interferometer of the fourth aspect the method comprising the steps of: generating a first state of a quantum cryptographic protocol by; sending a first control signal to change the phase of the thermo-optic controllable phase modulator for a first time period; and, sending a second control signal to change the phase of at least one of the silicon carrier depletion phase modulators for a second time period, the second time period being shorter in duration than the first time period.

The sixth aspect may be modified in any suitable way as disclosed herein including but not limited to any one or more of the following.

The method may comprise the steps of: generating a second state of the said quantum cryptographic protocol by; sending, after the second time period a control signal to change the phase of one of the silicon carrier depletion phase modulators for a third time period, the third time period ending on or before the end of the first time period.

The method as claimed in claim 34 wherein the second and third control signals are sent to any of: the silicon carrier depletion phase modulators in the interferometer arms paths for outputting respective first and second states of a first basis set; the silicon carrier depletion phase modulators in the output paths for outputting respective first and second states of a second basis set.

The method as claimed may be configured such that the said control signals are configured to adjust the phase of the respective silicon carrier depletion phase modulator by a value between $9\pi/20$ up to but not including $\pi/2$.

According to a seventh aspect of the present invention there is presented a method of operating the integrated optic interferometer of the first aspect, the method comprising the steps of: generating a first state of a quantum cryptographic protocol by: sending a first control signal to change the phase of the said further controllable phase modulator for a first time period; and, sending a second control signal to change the phase of at least one of the said controllable phase modulators for a second time period, the second time period being shorter in duration than the first time period.

The seventh aspect may be modified in any suitable way as disclosed herein including but not limited to any one or more of the following.

The method may comprise the step of: generating a second state of the said quantum cryptographic protocol by: sending, after the second time period a control signal to change the phase of one of the said controllable phase modulators for a third time period, the third time period ending on or before the end of the first time period.

The method may be configured such that the second and third control signals are sent to any of: the said controllable phase modulators in the interferometer arms paths for outputting respective first and second states of a first basis set; the said controllable phase modulators in the output paths for outputting respective first and second states of a second basis set The method may be configured such that the said control signals are configured to adjust the phase of the respective the said controllable phase modulators by a value between $9\pi/20$ up to but not including $\pi/2$.

According to an eighth aspect of the present invention there is presented a method of operating the integrated optic interferometer of the second and third aspect, the method comprising the steps of: generating a first state of a quantum cryptographic protocol by: sending a first control signal to change the phase of the said further controllable phase modulator for a first time period; and, sending a second control signal to change the phase of at least one of the said controllable phase modulators for a second time period, the second time period being shorter in duration than the first time period.

The eighth aspect may be modified in any suitable way as disclosed herein including but not limited to any one or more of the following.

The method may comprise the step of: generating a second state of the said quantum cryptographic protocol by: sending, after the second time period a control signal to change the phase of one of the said controllable phase modulators for a third time period, the third time period ending on or before the end of the first time period.

The method as claimed in claim 42 wherein the second and third control signals are sent to any of: the said controllable phase modulators in the interferometer arms paths for outputting respective first and second states of a first basis set; the said controllable phase modulators in the output paths for outputting respective first and second states of a second basis set.

The method may be configured such that the said control signals are configured to adjust the phase of the respective the said controllable phase modulators by a value between $9\pi/20$ up to but not including $\pi/2$.

Embodiments of the present invention will now be described in detail with reference to the accompanying drawings, in which:

FIG. 3 shows an example of a cross section of a silicon thermo-optic phase modulator;

Figure 1B:
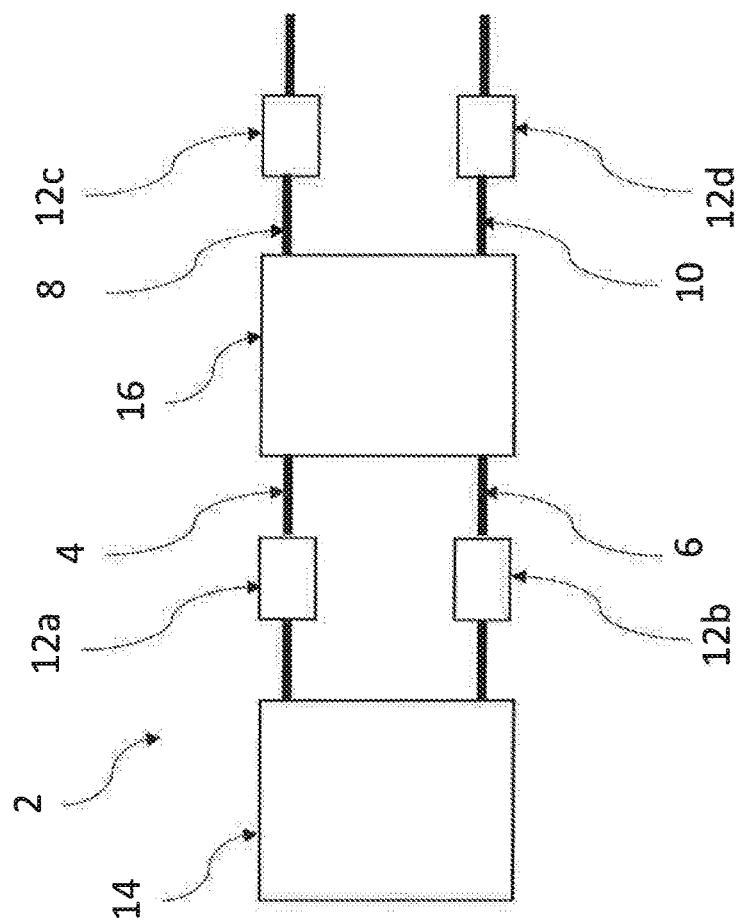
FIG. 1b shows a schematic example of an interferometer apparatus described herein having a first group of four phase modulators.
Figure 1A:
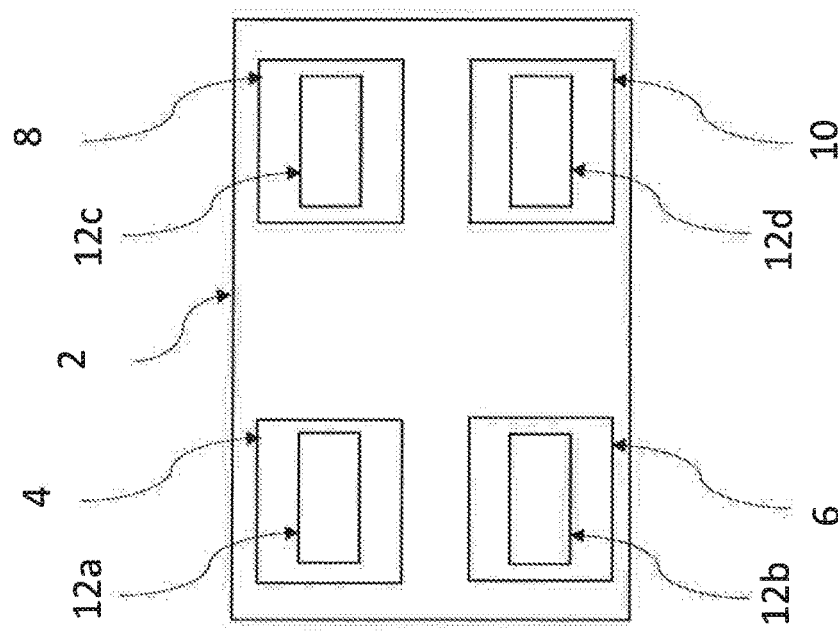
FIG. 1a shows a block diagram example of an interferometer apparatus described herein.
Figure 1D:
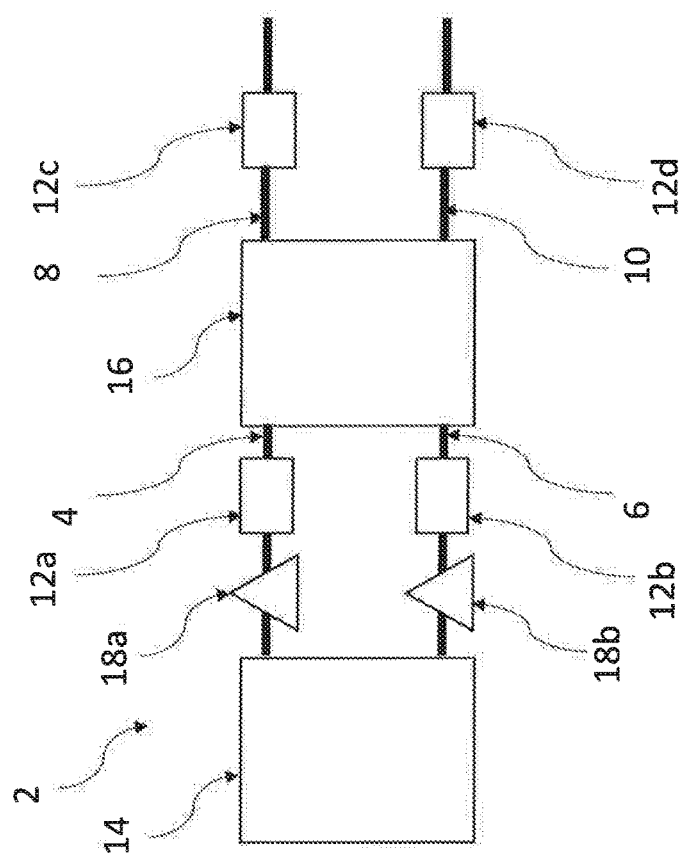
FIG. 1d shows a schematic example of an interferometer apparatus similar to FIG. 1c but having a group of two extra phase modulators.
Figure 1C:
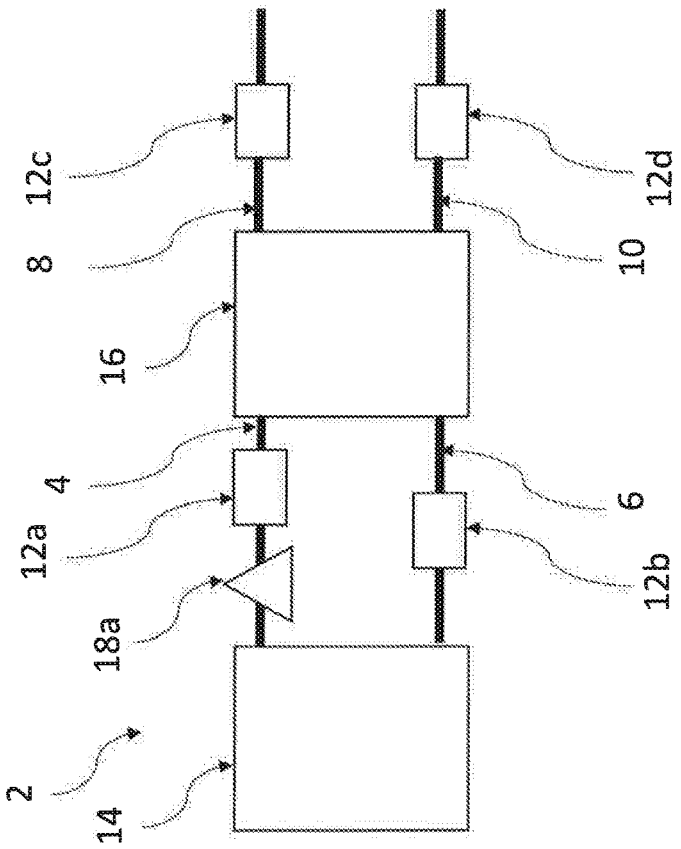
FIG. 1c shows a schematic example of an interferometer apparatus similar to FIG. 1b but having and an extra phase modulator.
Figure 1F:
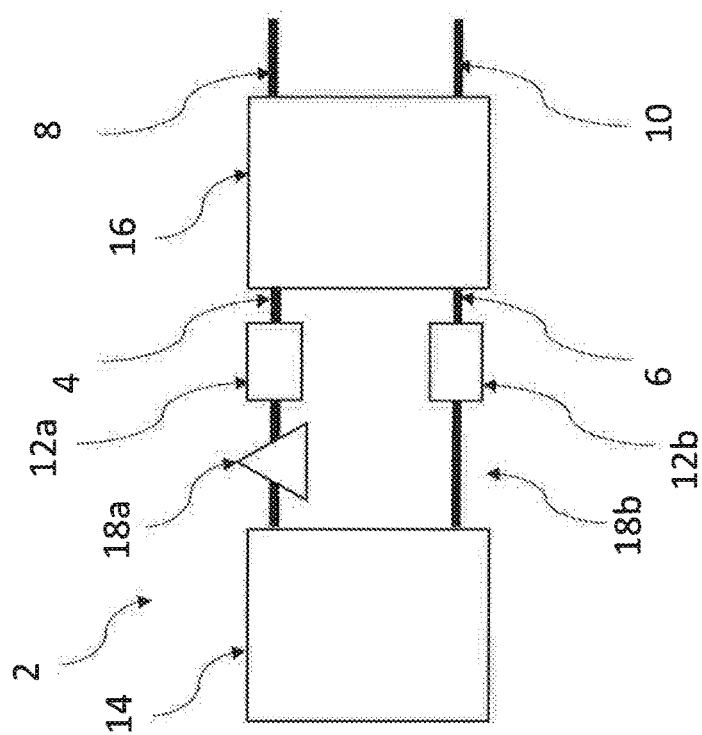
FIG. 1f shows a schematic example of an interferometer apparatus similar to FIG. 1c but having two phase modulators in the first group.
Figure 1E:
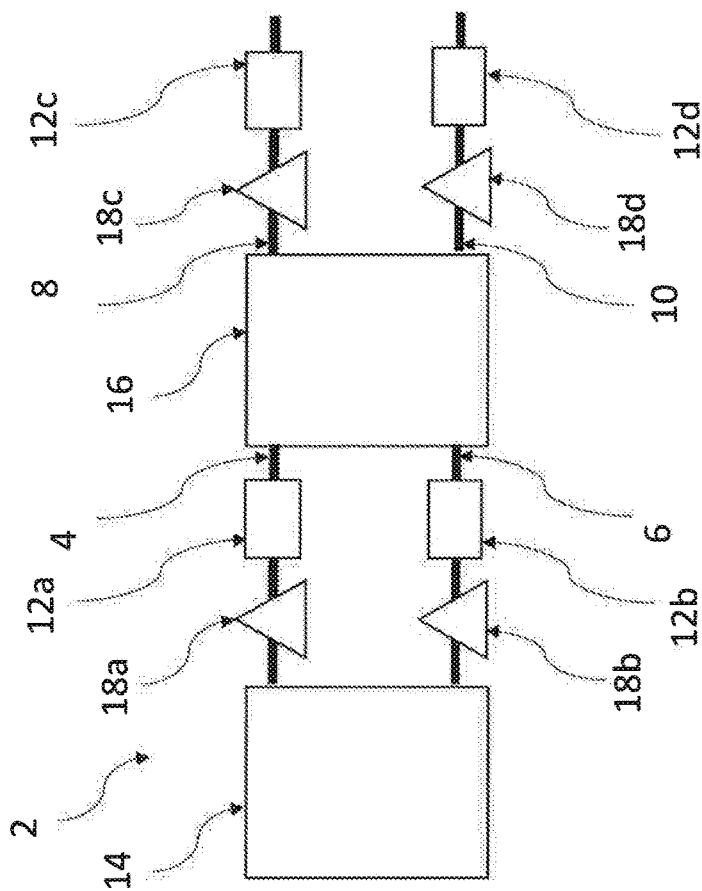
FIG. 1e shows a schematic example of an interferometer apparatus similar to FIG. 1d but having a group of four extra phase modulators.
Figure 7:
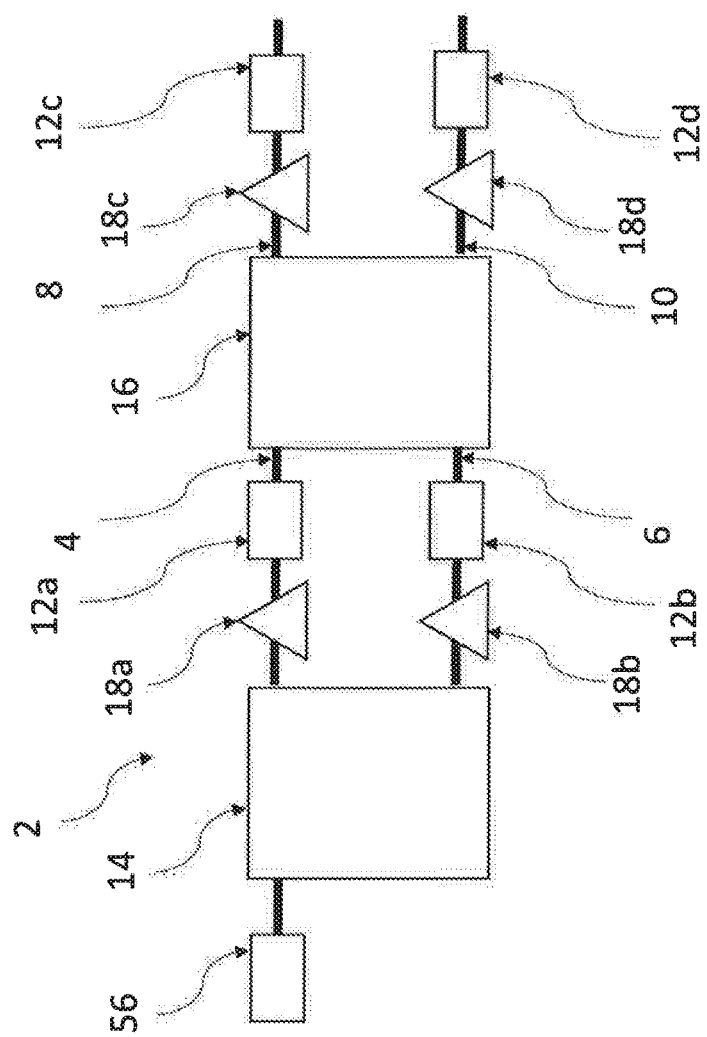
Figure 6:
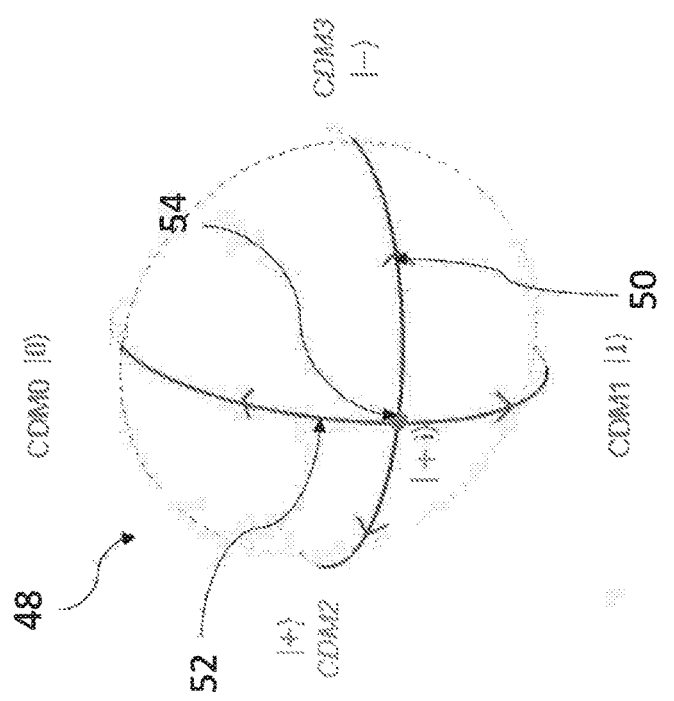
Figure 8:
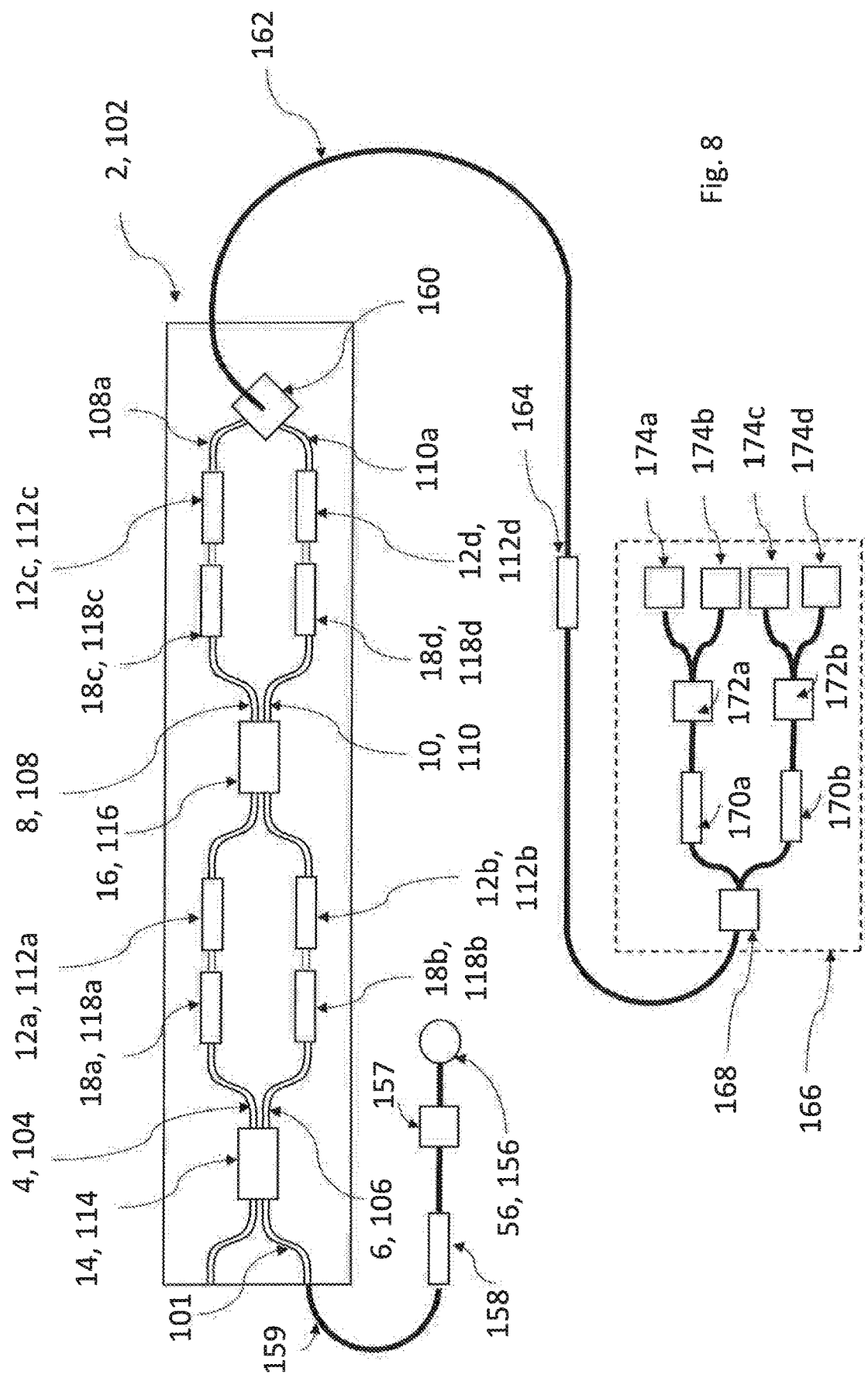
Figure 9:
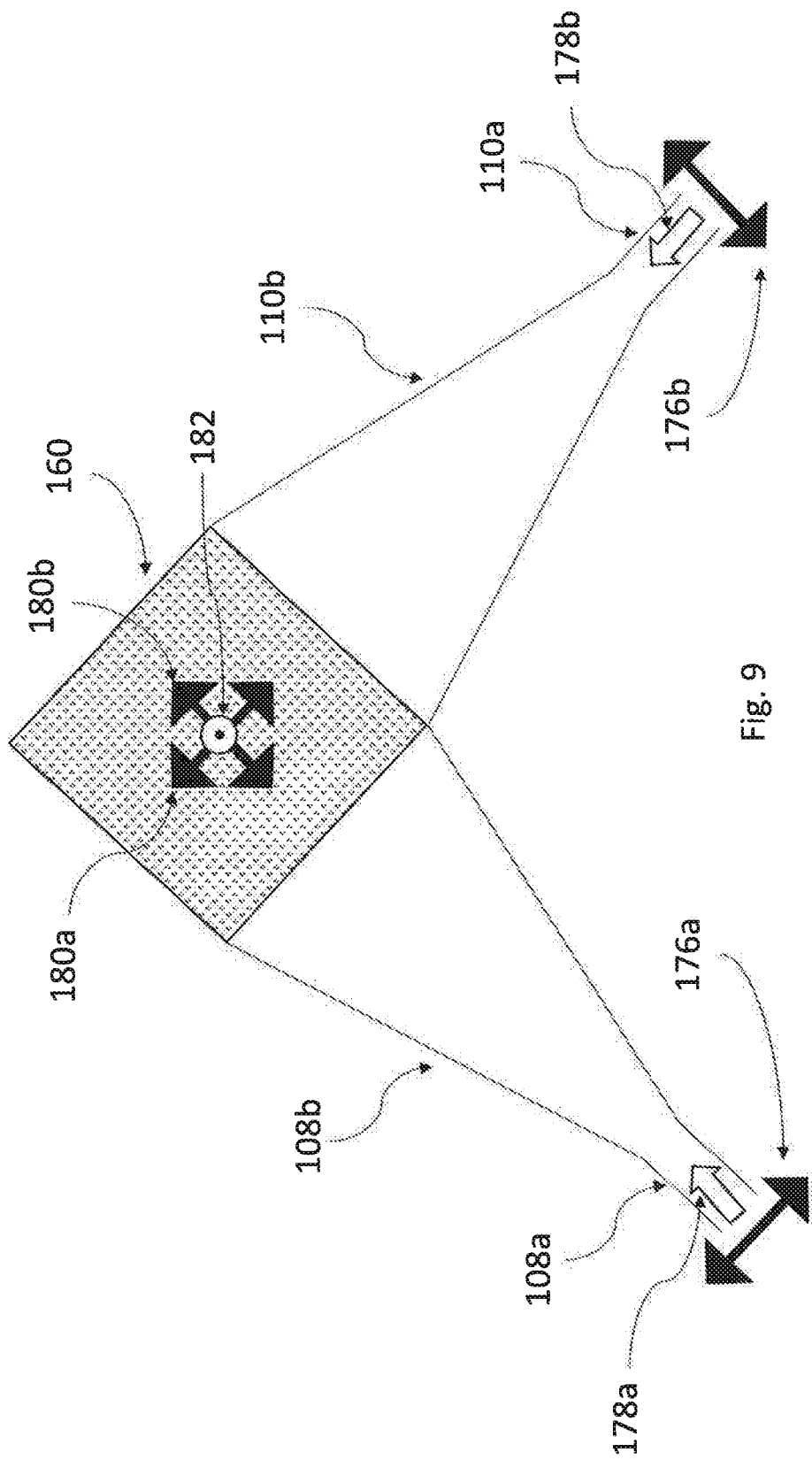
Figure 11B:
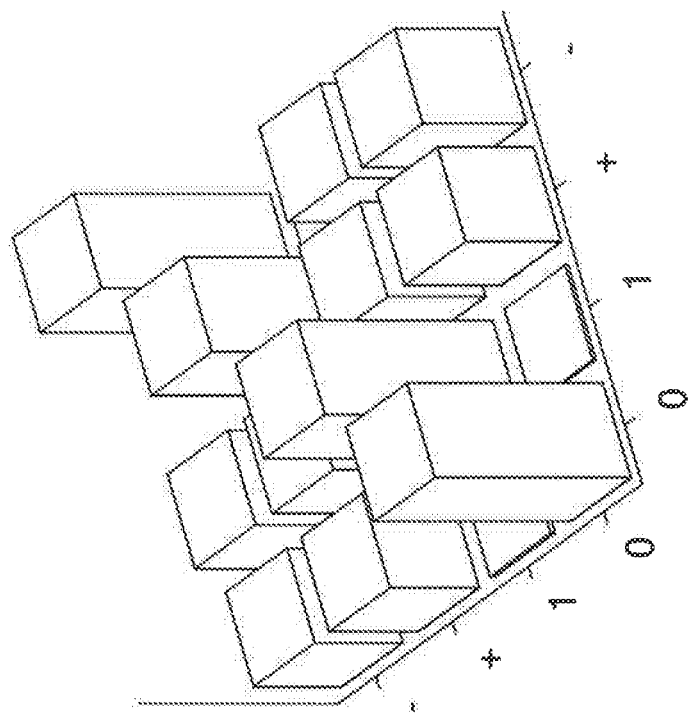
Figure 11A:
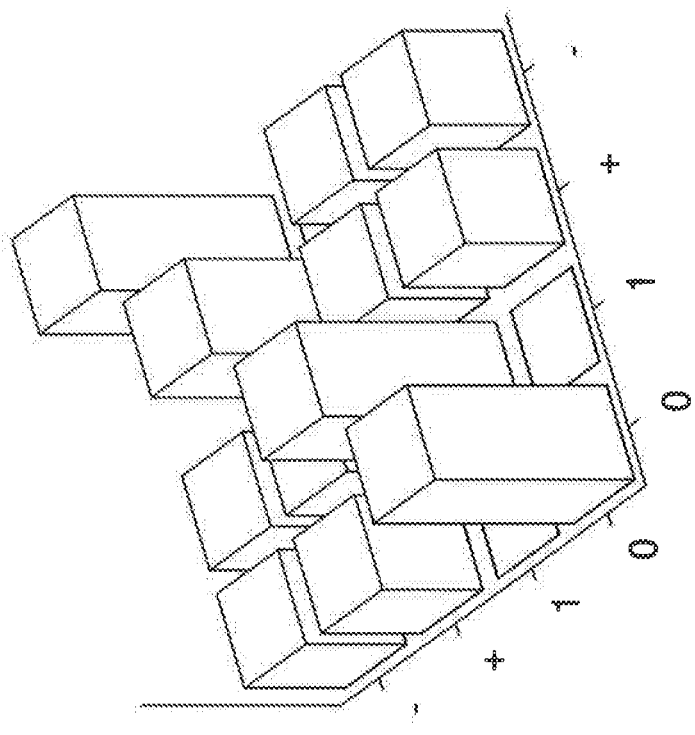
Figure 12:
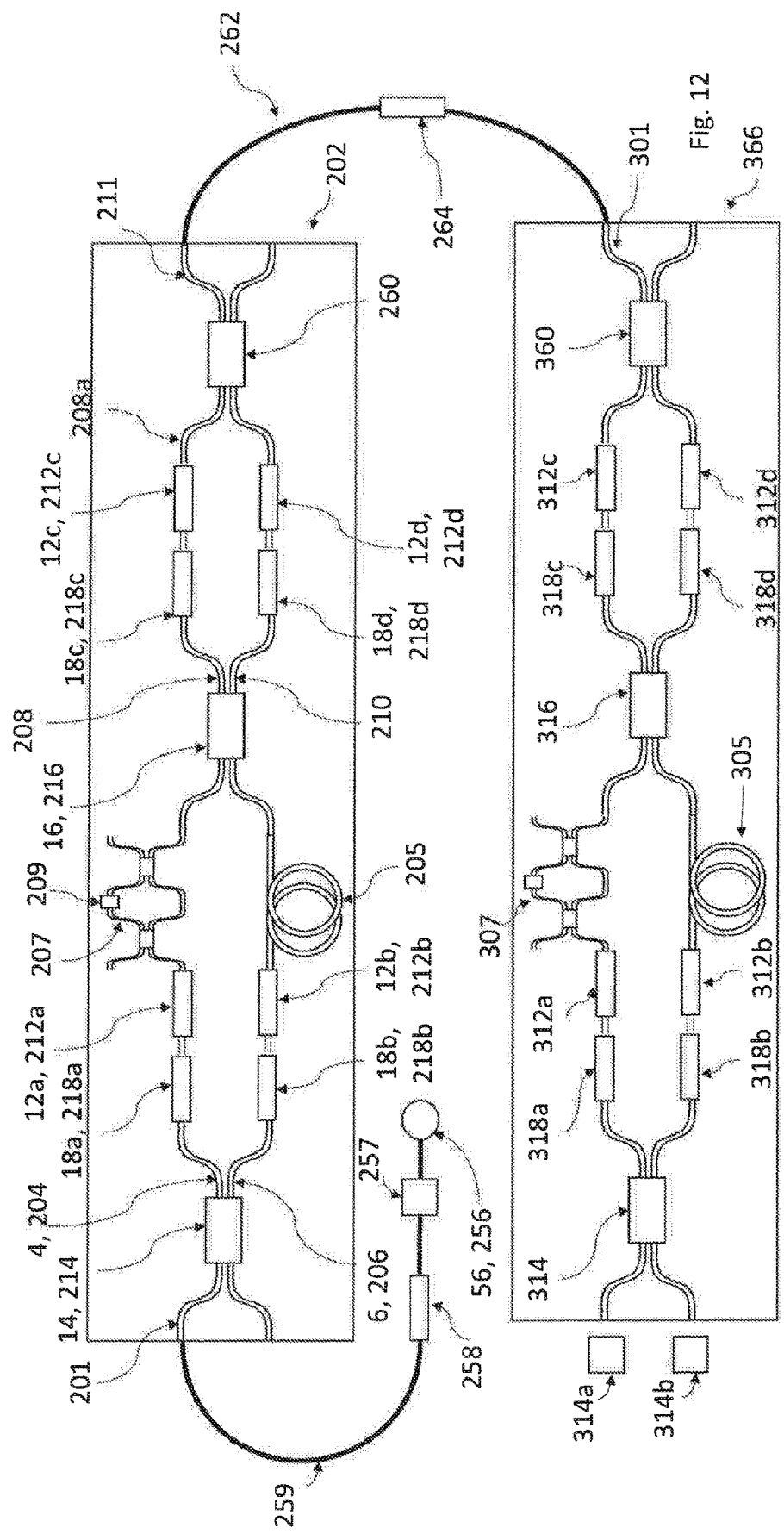
Figure 14A:
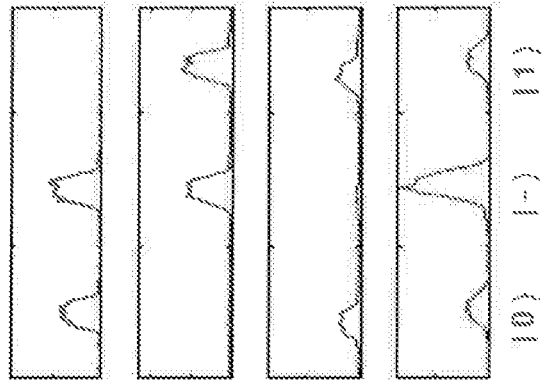
Figure 14B:
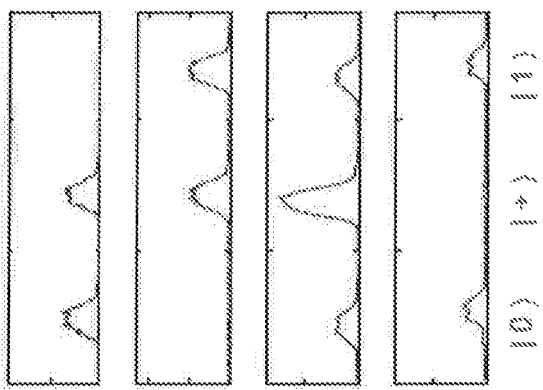
Figure 14C:
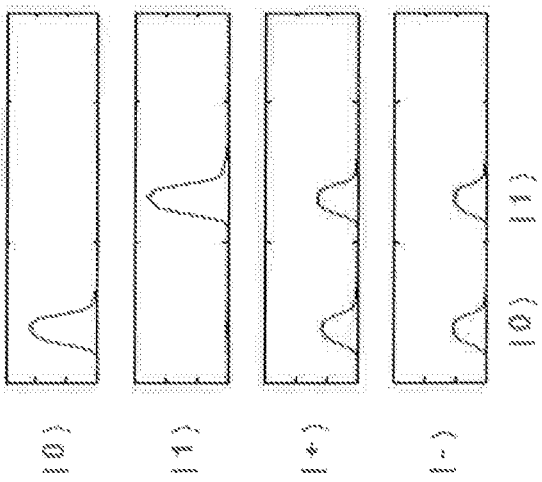

FIG. 4a plots the relationship between voltage and the transmission with respect to the different output arms of an interferometer apparatus when changing the voltage of a thermo-optic phase modulator in one of the interferometer arms;

FIG. 4b plots the relationship between voltage and the imparted phase of a thermo-optic phase modulator;

FIG. 4c plots the relationship between voltage and the change in transmission of a thermo-optic phase modulator;

FIG. 5a plots the relationship between voltage and the transmission with respect to the different output arms of the interferometer when changing the voltage of a silicon carrier depletion phase modulator in an interferometer arm;

FIG. 5b plots the relationship between voltage and the imparted phase of a silicon carrier depletion phase modulator;

FIG. 5c plots the relationship between voltage and the change in transmission of a silicon carrier depletion phase modulator;

FIG. 6 shows an example of a Bloch sphere;

FIG. 7 shows the interferometer apparatus of FIG. 1e coupled to a light source;

FIG. 8 shows an example of an interferometer apparatus for path-polarization encoding and a detection arrangement;

FIG. 9 shows a plan view of a 2D grating coupler used in the interferometer apparatus of FIG. 8;

FIG. 10a-10d show graphs of phase sweeps of different carrier depletion phase modulators of the interferometer apparatus of FIG. 8;

FIGS. 11a and 11b show graphs of modelled and example experimental probabilities of state preparation of the interferometer apparatus of FIG. 8;

FIG. 12 shows an example of an interferometer apparatus for time bin encoding and a detection arrangement;

FIGS. 13a-d show the apparatus of FIG. 12 having different output states arising from different phase biasing conditions;

FIGS. 14a-c show experimental traces of different time bins for BB84 states for the interferometer apparatus of FIG. 12.

DETAILED DESCRIPTION

There is presented an optical interferometer apparatus 2 comprising at least a first 4 and a second 6 interferometer arm path that are spatially separate from each other. An example of a block diagram of the interferometer apparatus is shown in FIG. 1a. The apparatus 2 further comprises at least two interferometer output paths 8, 10 that are spatially separate from each other. Each of A) the first and second interferometer arm paths 4, 6; and B) the first and second optical output paths 8, 10; comprises a controllable phase modulator 12a, b, c, d configured to controllably change the phase of light propagating along the respective path. The phase modulators 12a-d may be termed throughout as the 'first group' of controllable phase modulators.

The optical interferometer apparatus 2 described herein may be configured or adapted according to, or include any one or more of, the components/configuration of, any of the examples described herein.

Uses for the interferometer may include, but are not limited to, quantum key generation for quantum cryptographic systems and fast modulation in semiconductors such as silicon.

Modulation uses may include optical switching in optical communications devices such as use in long haul, metro and short haul networks, data communications and switches in apparatus and devices such as quantum computers and other optical information processing devices.

FIG. 1b shows a schematic diagram of an example of an interferometer apparatus 2 of FIG. 1a wherein the apparatus 2 comprises an optical splitter 14 configured to: receive input light; and, output the received input light upon the first interferometer arm path 4 and the second interferometer arm path 6. The apparatus in this example comprises an optical combiner 16 configured to: receive light from any of the first and second interferometer arm paths 4, 6; and output light upon the first and second interferometer output paths 8, 10.

The interferometer apparatus may be used for generating at least a first and a second state for each of two quantum cryptographic basis sets wherein the output from the controllable phase modulators of the first and second optical output paths are used together for defining each of the first and second states for each respective basis set.

Having the four controllable phase modulator 12a, b, c, d in the interferometer structure allows for phase biasing to create both data values for two basis sets. This is explained in detail later where each phase modulator can be used to generate a different one of each of the four states (two orthogonal states for each of two basis sets where each of the four states are orthogonal).

FIG. 1c shows a schematic example of optical interferometer apparatus 2 similar to that shown in FIG. 1b wherein a further controllable phase modulator 18a is provided along one of the optical arm paths 4.

In this example, the further controllable phase modulator 18a can be used to provide a constant (also referred to as 'DC') phase bias to the interferometer so that each of the phase changes imparted by the four controllable phase modulators 12a-d move about the Bloch sphere from a particular nominal '0' phase reference point to a further phase point on the Bloch sphere wherein each controllable phase modulator 12a-d moves the phase relationship to a different position on the Bloch sphere that is substantially orthogonal to the other states. This allows the interferometer apparatus 2 to align its nominal reference point (for no states) to the receiving apparatus's measuring phase reference point on the Bloch sphere. This is further explained later. In some examples of the interferometer 2 described herein, exactly orthogonal phase states of the Bloch sphere are not generated by the different controllable phase modulator 12a-d, but are close enough to orthogonal that they can still be used to generate a quantum cryptographic key.

FIG. 1d shows a further example similar to FIG. 1c wherein two further controllable phase modulators 18a, 18b are included into the optical interferometer apparatus 2, one in each of the optical arm paths 4, 6. The controllable phase modulators 18a and 18b of FIGS. 1c and 1d may be termed the 'second group' or 'second type' of phase modulators throughout. FIG. 1e shows a further example of an optical interferometer apparatus 2 similar to that shown in FIG. 1d wherein two more of the further controllable phase modulators 18c, 18d are included into the optical interferometer apparatus 2, one in each respective of the optical output path 8, 10.

In other examples, such as that shown in FIG. 1f, the optical interferometer apparatus 2 is configured such that at least one of: A) the first and second interferometer arm paths; and B) the first and second optical output paths; comprises a controllable carrier depletion phase modulator configured to controllably change the phase of light propagating along the respective path. In FIG. 1f the modulators are shown on the interferometer arm paths. Similarly, another example (not shown in the figures) of the apparatus 2 may be similar to that shown in FIG. 1f but with the controllable carrier depletion phase modulators being on the output arms 8, 10 rather than the interferometer arms 4, 6; and the thermo-optic phase modulator 18a being instead on one of the output arms 8 or 10.

There is therefore also presented an optical interferometer apparatus 2 comprising at least a first and a second interferometer arm path that are spatially separate from each other. In this example the apparatus 2 comprises at least two interferometer output paths that are spatially separate from each other. In this example, each of: A) the first and second interferometer arm paths; and, B) the first and second optical output paths, comprises a controllable phase modulator. Furthermore in this example, at least one of the said controllable phase modulators comprising a controllable carrier depletion phase modulator configured to controllably change the phase of light propagating along the respective path. In a similar example the carrier depletion phase modulator is replaced by a silicon charge carrier density phase modulator, which in turn may also be a silicon carrier depletion phase modulator.

Any of the interferometer apparatus 2 described above, including any of the examples, may be further configured or modified according to any of the examples described herein.

First Group of Phase Control Modulators 12a-d

The modulators of the first group 12a-d may be any type of optical phase modulator, but are preferably modulators that work on the refractive index changes arising from carrier manipulation.

At least one of the controllable phase modulators 12a, b, c, d may be a silicon phase modulator and/or a carrier depletion phase modulator. In some examples, each of the controllable phase modulators 12a, b, c, d is a silicon phase modulator and/or a carrier depletion phase modulator, preferably, all of the said controllable phase modulators 12a, b, c, d are silicon carrier depletion modulators. Carrier depletion modulators may be referred to herein as 'CDM'. Other examples of carrier depletion phase modulators include, but are not limited to Germanium or InP based modulators.

Other types of controllable phase modulator may be used for each of the aforementioned controllable phase modulator 12a, b, c, d. Preferably the controllable phase modulator 12a, b, c, d may be formed, and utilize the material properties, of any suitable material system including but not limited to a semiconductor material, such as silicon, $LiNbO_3$, GaAs or InP. For example, a controllable phase modulator 12a, b, c, d may be formed using $LiNbO_3$ and utilize the electro-optic effect. The type of modulator (i.e.

the physical effect used to provide the phase modulation) may be any suitable modulator including, but not limited to, a carrier injection modulator or a carrier depletion modulator. Other types of modulator may include modulators utilizing the Quantum confined Stark Effect or the Franz-Keldysh effect.

The first group of modulators 12a, b, c, d may each be the same type of modulator or may be different. The physical make-up (for example material, cross section, length) of the modulators 12a, b, c, d in the first group may be the same or may be different.

The modulators may be formed according to any suitable type of modulator structure including, but not limited to a bulk optical component or, preferably an integrated optic component guiding light using a waveguide structure. The modulators 12a, b, c, d may be optically coupled to other parts of the optical interferometer apparatus 2 using any suitable optical coupling and alignment means such as, but not limited to any of: free space optical alignment, fibre optic coupling, being integrated with one or more other components or parts of the interferometer. In one example the phase modulators 12a, b, c, d form part of an integrated apparatus, for example a device such as a chip.

The interferometer apparatus 2 may comprise more than one controllable phase modulator 12a-d along any one of an arm 4, 6 or output path 8, 10, for example two similar controllable phase modulators may be located in series along the same output optical path 8, 10, or along the same interferometer arm path 4, 6.

The phase modulators 12a-d are controllable by allowing an external input to impart a phase change upon light propagating along the respective optical path. Preferably, the phase modulators 12a-d allow for a range of different phase changes to be controllably imparted, for example any one or more of, but not limited to: 0-2π, 0-π, 0-π/2; or other values of phase as described herein.

The first group of modulators 12a-d preferably may have any low-pass −3 dB modulation bandwidth, this may be between, for example; any of: 0-50 GHz, preferably 100 KHz-50 GHz, more preferably 100 MHz-15 GHz, even more preferably 10-15 GHz. In one example input pulses are used having 1 GHz repetition rate (with a loops pulse width), wherein the first group of phase modulators need to have bandwidth of greater then 10 GHz. The modulators may transmit and be configured to operate with any wavelength range supported by the material system and structure of the modulator. Preferably the wavelength range is between 1260 nm and 1675 nm (DWDM telecommunication band), more preferably between 1530 nm and 1565 nm (C-Band) and/or 1260 nm and 1360 nm (the O-band).

Figure 2:
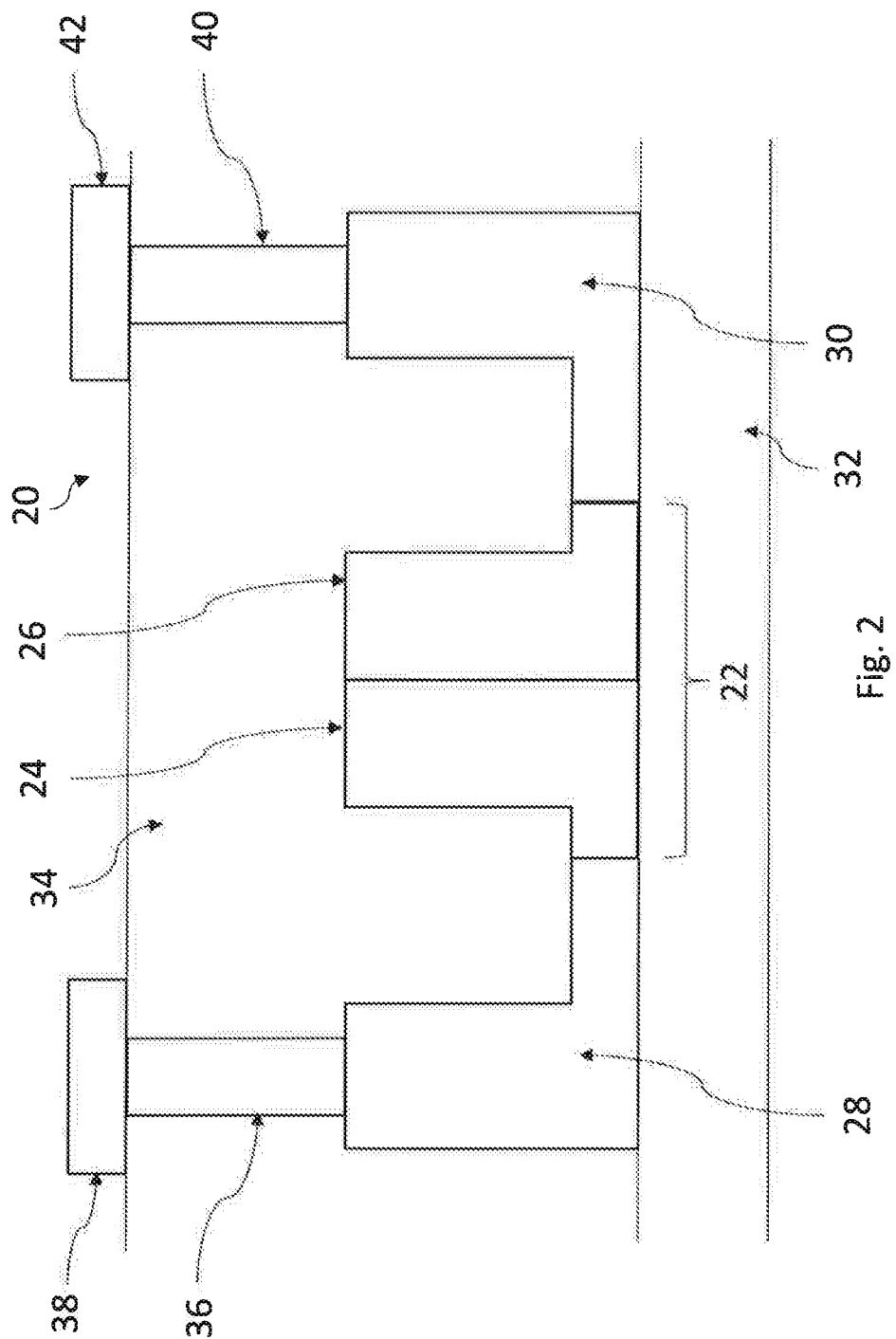
FIG. 2 shows an example of a cross section of a silicon carrier depletion phase modulator.

FIG. 2 shows a schematic example of a cross section of an integrated optic silicon carrier depletion modulator 20 that may be used with the optical interferometer apparatus 2 described herein. Any discussion herein as to 'height', 'depth', and 'width' and other orientation terminology, with respect to this figure and any other figure herein showing structural cross section, are intended to be interpreted where the top of device is at the top of the figure and the bottom of the device is at the bottom of the figure wherein height and depth of features are along directions running parallel from the top of the device to the bottom the device.

The integrated optic silicon carrier depletion modulator 20 in this example comprises a waveguide core 22 having a p-doped silicon section 24 adjoining an n-doped silicon section 26. The n and p-doped silicon sections are substantially symmetrical, in cross section, about the adjoining line running between them. The p-doped section 24 of the core is adjoined to a p++-doped section 28, opposite, in cross section, to where the p-doped section 24 adjoins the n-doped section 26. Similarly, the n-doped silicon section 26 of the core is adjoined to a n++-doped section 30, opposite, in cross section, to where the p-doped section 24 adjoins the n-doped section 26. The n, p, n++ and p++ doped sections 24, 26, 28, 30 reside upon a supporting under-cladding layer 32 such as $SiO_2$. Each of the n++ and p++ doped sections are adjoined by signal 36 and ground 40 pillars formed from VIAs of metal or highly doped semiconductor that extend upwardly away from the under-cladding layer 32, though an over cladding layer 34 and terminate in signal 38 and ground 42 electrical contacts that reside proud of the top external surface of the over-cladding layer 34. The over-cladding layer 34 may be formed of a similar material as the under-cladding layer. The length of the carrier depletion modulators can be any length but is typically 0.5 mm-5 mm, preferably 1-2 mm. One typical length is 1.5 mm.

The operating voltage range of the first group of controllable phase modulators can be any suitable range. For example, carrier depletion phase modulators may typically be driven with a voltage swing between 3-4 volts to obtain the required phase change to switch between two states of the same basis set. The voltage swing may be reduced by increasing modulator length.

The integrated optic silicon carrier depletion modulator 20 is preferably formed from a silicon substrate that is doped using standard silicon processing methods wherein its cross sectional structure is formed using standard silicon processing methods such as patterning, etching and layer growth. Furthermore, any other suitable carrier depletion modulator structure may be used.

Second Group of Phase Control Modulators

In some examples, the optical interferometer apparatus 2 may comprise further controllable phase modulators 18a/b. These modulators are preferably of a different type (i.e. impart the phase change using a different physical principle or effect) than the controllable phase modulators 12a, b, c, d. Preferably the further modulator/s 18a/b are modulators that are based on material properties and physical mechanisms that impart a refractive index change with a negligible change in the absorption/gain of the optical signal propagating through the phase modulator as the refractive index is changed through the modulators typical range of operation. In other words there is substantially no loss or gain in the optical signal as it passes through the phase modulators 18a/b regardless of the phase change it is imparting upon the optical signal. The second group of modulators are preferably located on at least one, possibly both, of the interferometer arm paths 4, 6 but may also be located on any one or more of the other optical paths of the interferometer apparatus 2, such as the output paths 8, 10.

A preferred type of controllable phase modulator 18a/b of the second group is a phase modulator that has no or negligible effect (neither increase nor decrease) on the optical amplitude output from the said modulator upon an applied change in phase by the same modulator. Preferably the controllable phase modulator of the second group provides negligible change in output optical amplitude with any imparted phase change between 0-π, more preferably 0-2π. A preferred example of this type of modulator 18a/b is a thermo-optic phase modulator 44, also termed herein as a 'TOPM'. FIG. 3 shows an example of a schematic cross section of a thermo-optic phase modulator 44 where similar features to the carrier depletion modulator 20 are shown with like references numerals. In this example the waveguide core 46 is formed from intrinsic silicon wherein side pedestals protrude laterally away from the core at its bottom such that the core resembles an inverted 'T' shape. The outer lateral edges of both the opposing side pedestals are adjoined by p doped sections 28. The thermo-optic phase shifters may be of any length (along the direction of propagation of the light travelling through them), but are preferably between 50 μm to 200 μm range. Because optical circuits, including planar lightwave circuits, are often subject to localized temperature fluctuations, which in turn affect the relative phases between pulses states, the controllable phase modulator may be used to tune the optical circuit to provide the desired nominal phase point or 'DC phase bias'. It is from this controlled DC bias point that the first group of controllable phase modulators 12a-d impart their phase to give effect to the different output states of a QKD protocol.

The optical interferometer apparatus 2 may comprise more than one controllable phase modulator 18a/b along an arm 4, 6 or output path 8, 10 within the second group, for example two similar controllable phase modulators may be located in series along an interferometer arm path 4, 6.

In one example the second group of modulators are configured to have a low-pass −3 dB modulation bandwidth in the KHz range.

Operation

An example of the operation of the apparatus 2 is now described with reference to FIG. 1c where the interferometer is a Mach-Zehnder (MZI) type interferometer. Other examples of the apparatus 2 may work in a similar fashion. Reference is also made to generating four states for the two basis sets of the BB84 protocol, however other protocols may be generated using the apparatus 2. Reference is also made to using silicon carrier depletion modulators being the first group of modulators 12a-d, a TOPM being a further phase modulator 18a in one interferometer arms 4, 6. The principles of operation and advantages of the phase control scheme may equally apply to other combinations of modulators, but has advantages when using phase modulators for the first group where phase modulator transmission varies with induced phase change as a result of applied voltage. Phase modulators where the output phase modulator transmission varies with induced phase change are typically phase modulators that operate at higher speeds such as modulators that work on the refractive index changes arising from carrier manipulation, for example carrier depletion or carrier injection.

For the purposes of describing the operation of the apparatus 2 herein, one may also define pulses being in different 'bins'. These are pulse states that can have zero intensity (for no pulse) and non-zero intensity (for at least one photon). The non-zero intensity pulse states transmitted and received by the apparatus 2 typically have mean photon numbers (μ) less than 1. At least for weak coherent sources, such as an attenuated laser, a pulse state cannot be guaranteed to have one photon, no photons or multiple photons until a measurement is made. Some of the protocols described herein therefore aim to maximize the possibility of creating a single photon pulse or a zero photon pulse by configuring the apparatus 2 to provide an appropriate extinction ratio between the two intended outputs. The extinction ratio between a non-zero photon pulse and a zero photon pulse is preferably >10 dB, more preferably, >20 dB.

In this example, the apparatus 2 receives input pulsed light from a light source (not shown) wherein each received pulse is in a different time bin. The light source may be a part of or may be separate to the apparatus 2.

The splitter 14 gives rise to an incoming received photon having a probability of being in either arm. Preferably the splitter 14 is design to be as close to 50/50 splitting ratio as possible so that there is an equal probability of the photon being in either arm 4, 6. None, one or both of the controllable phase modulators 12a, 12b of the arms 4, 6 imparts a phase change. The combiner 16 combines the optical paths of the two arms 4, 6 and provides two output channels (output optical paths) 8, 10 where the photon, again has a probability of being in either channel. None, one or both of the controllable phase modulators 12c, 12d then imparts a phase change. Where it is stated that 'none' of the modulators 12a/b or 12c/d impart a phase change, it is understood that at least one of the modulators 12a-d imparts a phase change (i.e. if none of 12a/b imparts a phase, then one or both of 12c/d impart a phase).

If the apparatus is set-up to only use one phase modulator 12a-d at a time to define a particular state of a basis set then the said modulator imparts a phase change of, or close to, π/2. In alternative arrangements, a 'push-pull' system may be used where two modulators are active to define the phase change. In this push-pull system each of the two active modulator's 12a-d are biased to a nominal amount, typically with the same phase. Modulation occurs when one of the modulators 12a-d changes its input voltage to increase change its imparted phase whilst the other changes its input voltage to decrease its imparted phase.

The TOPM is used to provide a constant phase bias. FIG. 4a plots the relationship between voltage (X axis) and the transmission (Y-axis) with respect to the different output arms of the interferometer 2 when changing the voltage of a TOPM in an interferometer arm. FIG. 4b plots the relationship between voltage (X axis) and the imparted phase (Y-axis, in number of π radians) of a TOPM. FIG. 4c plots the relationship between voltage (X axis) and the change in transmission (DT) of the TOPM. TOPMs allow for almost ideal state preparation with a phase relationship proportional to the square of the voltage ($V^2$) and no change in transmission (ΔT).

In this example to describe the operation of the apparatus 2, a set of silicon carrier depletion modulators are used. The following describes the operation and basis state preparation for the apparatus 2 using these modulators, however in principle other modulators may be used at described herein.

Silicon has no natural $\chi^2$ non-linearity and therefore the high-speed electro-optic effect cannot be used. Carrier depletion modulation induces a phase by reducing the carriers occupying the region which overlaps with the optical mode. This is achieved by reverse biasing a p-n junction formed by doping p and n regions in the core of the silicon waveguide. The depletion of carriers in the waveguide decreases the absorption of the waveguide and induces an optical phase change; however, this effect saturates as the waveguide becomes fully depleted of carriers.

For CDM's, if the current remains low, the phase response can be modelled as:

$$\phi(V) = \alpha[1 - \exp(-\beta V)] \qquad [1]$$

where α and β are device dependent parameters that will vary due to doping profiles and device geometry. There is also a phase dependent loss limiting the operating conditions achievable. The change in transmission Δγ can be described as:

$$\Delta\gamma(V) = \gamma_0[1 - \exp(-\beta V)] + 1 \qquad [2]$$

where $\gamma_0$ will also depend on the doping profiles and device geometry.

These relationships illustrate that the achievable phase will tend towards α as V increases at a rate determined by β. For a given doping profile and waveguide geometry this saturation value will vary dependent on the length of the device, with longer lengths inducing a greater phase. Increasing the length increases overall loss that will incur in the CDM, and also decrease the modulation speed.

FIG. 5a plots the relationship between voltage (X axis) and the transmission (Y-axis) with respect to the different output arms of the interferometer 2 when changing the voltage of a silicon carrier depletion phase modulator in an interferometer arm 4, 6. The curve following the square shaped data points represents one output whilst the curve following the diamond shaped data points represents the other output. FIG. 5b plots the relationship between voltage (X axis) and the imparted phase (Y-axis, in number of n radians) of a silicon carrier depletion phase modulator. FIG. 5c plots the relationship between voltage (X axis) and the change in transmission (DT) of a silicon carrier depletion phase modulator. These graphs illustrate that the induced phase saturates below π over 8 V while the transmission continues to increase.

The phase-dependent loss characteristics and saturation of the CDMs can severely reduce operational fidelity. This is especially damaging for quantum applications where requirements are often more stringent than many classical applications.

The principle of operation is that by using the TOPMs to phase bias the interferometer apparatus 2 in a favourable operating regime, the modulation depth required for each individual CDM is therefore advantageously limited. For example, the CDM may only need to impart a π/2 phase change rather than a n phase change. Limiting the applied voltage for each CDM helps to mitigate the negative characteristics (phase-dependent loss characteristics, saturation, and operational fidelity) for both pulse modulation and state preparation.

This can be further explained with reference to FIG. 6 which shows a Bloch sphere 48 where we start by preparing the state |+i⟩ (reference numeral 54 on the Bloch sphere), using one TOPM to provide a constant phase offset, with near unit fidelity. It will be appreciated that other mechanisms/means may be used to create this offset phase bias including using multiple TOPM's in different interferometer arms 4, 6 and/or output paths 8, 10.

The four CDMs (two modulators 12a,b on the arms 4, 6; and two modulators 12c,d on the output paths 8, 10) are used to prepare any of the four BB84 states: {|0⟩, |1⟩, |+⟩, |−⟩} by shifting each of the CDMs by about π/2 respectively.

The |0⟩ state, of the basis set having states |0⟩, |1⟩, is generated with a phase relationship on the Bloch sphere 48 shown at the point with reference CDM0. This state is achieved by biasing the CDM 12a on the interferometer arm 4. The |1⟩ state, of the basis set having states {|0⟩, |1⟩}, is generated with a phase relationship on the Bloch sphere 48 shown at the point with reference CDM1. This state is achieved by biasing the CDM 12b on the interferometer arm 6. Once the thermo-optic phase modulator has set the phase bias offset of the interferometer to the state |+i⟩ then π/2 phase shift from one of the CDMs 12a/b provides any of the two states {|0⟩, |1⟩} by moving around the line 52.

The |+⟩ state, of the basis set having states {|+⟩, |−⟩}, is generated with a phase relationship on the Bloch sphere 48 shown at the point with reference CDM2. This state is achieved by biasing the CDM 12c on the output arm 8. The |−⟩ state, of the basis set having states {|0⟩, |1⟩}, is generated with a phase relationship on the Bloch sphere 48 shown at the point with reference CDM3. This state is achieved by biasing the CDM 12d on the output arm 10. Once the thermo-optic phase modulator has set the phase bias offset of the interferometer to the state |+i⟩ then π/2 phase shift from one of the CDMs 12c/d provides any of the two states {|+⟩, |−⟩} by moving around the line 50.

This approach limits each CDM to π/2 phase-shift thus minimising the effects of phase dependent transmission across all four BB84 states and allowing state preparation with nominal non-ideal phase modulators. The above describes driving the interferometer to create two orthogonal states for each of two orthogonal basis sets, however if only one orthogonal basis set is required then an interferometer apparatus 2 such as that shown in FIG. 1f may be used or alternatively an interferometer apparatus 2 similar to FIG. 1f where the two CDMs and the TOPM are on the output paths 8, 10.

Using the above example, the outputs of the interferometer apparatus are:

$$|\psi\rangle = \alpha[\gamma_2 \exp(i(\phi_2+\theta_1))(\gamma_0 \exp(i\phi_0)-\gamma_1 \exp(i(\phi_1+\theta_0))) |0\rangle + i\gamma_3 \exp(i\phi_3)(\gamma_0 \exp(i\phi_0)+\gamma_1 \exp(i(\phi_1+\theta_0)))|1\rangle] \quad [3]$$

where φi and γi and the carrier depletion voltage dependent phase and transmission terms, θi are the thermo-optic phase shifts, and α is the normalization term:

$$\alpha = \sqrt{\gamma_2^2(\gamma_0^2 + \gamma_1^2 - 2\gamma_0\gamma_1\cos(\phi_0 - \phi_1 - \theta_0)) + \gamma_3^2(\gamma_0^2 + \gamma_1^2 + 2\gamma_0\gamma_1\cos(\phi_0 - \phi_1 - \theta_0))} \quad [4]$$

The TOPM is set to the phase bias offset state about the Bloch sphere (also known as the DC state) which can be expressed as follows:

$$|\psi\rangle_{DC} = |+i\rangle = \frac{|0\rangle + i|1\rangle}{\sqrt{2}} \quad [5]$$

The output of optical apparatus 2 in this description of operation provides path encoded states of the basis sets whereby the optical states of the basis set are derived by comparing the pulse state in each of two physically separate output paths. This path encoded output may be further converted into other encoded schemes including, but not limited to, polarization encoded QKD.

Due to the presence of non-zero phase dependent loss in the CDM's, a fidelity of 100% is not achieved, however a fidelity of at least 99.5% is theoretically possible, providing a QBER of smaller than or equal to 1.1% for the modulators illustrated in FIGS. 4 and 5.

Some modulators such as, but not limited to, carrier depletion modulators may better achieve a desired state by being biased to less than π/2, preferably between 9π/20 and up to, but not including, π/2. Some modulators exhibiting more ideal operating characteristics may bias between 9π/20 and up and including π/2.

Pre-biasing of the interferometer apparatus, for example by a thermo-optic phase modulator allows the state generating interferometer apparatus 2 to be calibrated to a reference frame that is analyzable by a receiver apparatus or calibrated to a receiver apparatus.

Accordingly there is presented a method of operating an integrated optic interferometer 2 as described herein. The method may use any suitable control apparatus for generating the control signals to drive the interferometer apparatus 2 including electronic control apparatus described elsewhere herein such as, but not limited to electronic pulse/pattern generators. The control signals are preferably electrical control signals.

The method generates a first state of a quantum cryptographic protocol by sending a first control signal to change the phase of a controllable phase modulator from the second group (for example a thermo-optic phase modulator 0) for a first time period. The method also sends a second control signal to change the phase of at least one of the said controllable phase modulators of the first group (for example a silicon carrier depletion phase modulator) for a second time period. The second time period being shorter in duration than the first time period.

The first control signal may be sent before the second control signal or at the same time as the second control signal so that the phase change imparted by virtue of the second control signal is during the period that the phase change is being imparted by virtue of the first control. The end of the second time period does not occur after the end of the first time period.

The method may then generate a second state of the said quantum cryptographic protocol by sending, after the second time period a control signal to change the phase of one of the said controllable phase modulators for a third time period. The third time period ending on or before the end of the first time period.

The second and third control signals may be sent to any of: A) the said controllable phase modulators in the interferometer arms paths for outputting respective first and second states of a first basis set; B) the said controllable phase modulators in the output paths for outputting respective first and second states of a second basis set.

The Optical Interferometer Apparatus

The interferometer apparatus may be used for a number of applications including, but not limited to quantum cryptographic key generation. As with the operation of the phase modulators 12a-d, the other component parts of the interferometer apparatus 2 may support any wavelength range supported by the material system and structure of the material system carrying the optical signal. Preferably the wavelength range is between 1260 nm and 1675 nm (DWDM telecommunication band), more preferably between 1530 nm and 1565 nm (C-Band) and/or 1260 nm and 1360 nm (the O-band).

The optical paths between the phase modulators, and other components may be any suitable optical path including but not limited to, free space optical paths, fibre optic optical paths, waveguide optical paths integrated optic paths which may be monolithically integrated onto the same material platform as other components, or be hybrid integrated where multiple waveguide based material systems are mechanically coupled and optically linked together. Waveguide optical paths may be any type of waveguide including but not limited to buried channel waveguides, ridge or rib waveguides. Where different components are formed separately they may be optical aligned together using any appropriate method including passive alignment or active alignment.

The interferometer apparatus 2 may be formed as a device. The device may comprise a planar type structure such as a chip or other platform for accommodating integrated optic components. The chip is preferably a substantially planar device having a substantially rectangular cross section. The plan shape is typically rectangular having length and width dimensions of typically, but not exclusively 2 mm-150 mm, more preferably 2 mm-50 mm, more preferably 2 mm-10 mm, more preferably 2 mm-5 mm, most preferably around 2.5 mm. The in-plan chip length may have any suitable dimension, for example, but not limited to: between 0.5 mm-5 mm, between 1-2 mm, preferably 1.5 mm. The chip may have other components included upon it, for example, but not limited to a light source.

The interferometer apparatus 2 may have input and/or output waveguides terminating at end facets of the chip or other optical output terminations. End facets may have mode converters to couple to other components such as optical fibres. In some examples, light may enter and/or exit the device via a direction out of the plane of the device such as via a grating coupler.

Where the interferometer apparatus 2 uses waveguides for some or all of its optical paths, the waveguides are preferably single mode in the wavelength range of interest, preferably single mode in a single polarization, preferably the TE polarization. The waveguide core may be of any suitable geometry. In one example, the waveguide core may be a buried channel waveguide formed of intrinsic silicon surround by silicon dioxide cladding having a cross sectional geometry with a core height of 150-250 nm and width of 400-600 nm, more preferably 200 nm height and 500 nm width. One or more of the portions of cladding material surrounding the core may be other materials such as, but not limited to, polymer.

The optical splitter 14 may be any optical splitter including, but not limited to a bulk optical component such as a beam splitter, an optical fibre component such as a 1×2 or 2×2 fibre coupler or an integrated optic component such as a Y-branch, directional coupler, star coupler or MMI (Multi-Mode Interference) coupler. The splitter 14 comprises at least one input port and at least two output ports. Preferably the optical splitter is a 2×2 MMI coupler. The examples of integrated optic splitters are preferably integrated with one or more input and output waveguides that guide light to other components such as the controllable phase modulators 12a, b, c, d or 18a-d. The integrated optic examples of the splitter 14 are preferably formed of an intrinsic silicon waveguide core surrounded by silicon dioxide.

The optical combiner 16 may be any optical combiner including, but not limited to a bulk optical component such as a beam splitter, an optical fibre component such as a 2×2 fibre coupler or an integrated optic component such as a directional coupler, star coupler or MMI coupler. The combiner 16 comprises at least two input ports and at least two output ports. Preferably the optical splitter is a 2×2 MMI coupler. The examples of integrated optic combiners are preferably integrated with one or more input and output waveguides that guide light to other components such as the controllable phase modulators 12a, b, c, d or 18a-d. The integrated optic examples of the combiner 16 are preferably formed of an intrinsic silicon waveguide core surrounded by silicon dioxide.

Input Sources

The interferometer apparatus 2 may further comprise a light source configured to input pulses to the optical splitter 14. The light source can be any optical source in principle. Preferably the light source comprises a temporally modulated laser source. The laser source may be any laser source in principle. The laser source may comprise a directly modulated laser source that outputs pulses or may comprise a continuous wave (CW) source with its output modulated into pulses by a separate modulating element. Preferably the source is a CW source with external modulation to provide a stable phase relationship between subsequent pulses and higher modulation rates. This could also be achieved with a pulsed-laser source. The light source is preferably tunable so that the output wavelength can be changed. The light source preferably comprises a wavelength tunable CW laser source with an external pulse modulator that outputs pulses at the repetition rates required by the interferometer apparatus disclosed herein.

An example of a light source 56 forming part of the interferometer apparatus 2 of FIG. 1f is shown in FIG. 7 where the output pulses from the light source 56 are input pulses into the optical splitter 14. The input pulses may be a train of pulses output arbitrarily, for example by a random modulation pattern.

The input pulses received by splitter 14 are preferably a train of input pulses (not shown). Preferably the input train is a train of non-zero intensity pulse states wherein each pulse has substantially the same intensity.

There now follows examples of the interferometer apparatus 2. The component configurations in the following examples are not intended to be limiting and may be modified or adapted according to any of the optional components or configurations described herein, including any components or configurations of other examples described herein.

Polarization Encoding

FIG. 8 shows an example of an interferometer apparatus 2 embodied in this example as a balance 2×2 Mach-Zehnder interferometer device 102 where the two optical outputs are combined into a single output path. The optical inputs and outputs to the integrated device may be termed as input and output ports respectively. The interferometer in this example uses silicon integrated optic waveguides to form the Planar Lightwave Circuitry (PLC) on the chip from the optical input port to the optical output port. The first and second set of modulators 12a-d, 18a-d used in this apparatus 102 use silicon-based buried channel integrated optic waveguides that optically connect to other silicon buried channel integrated waveguides of the PLC. This device 102 could be a chip that also may be packaged to include input/output single mode optical fibres optical coupled to the input/output ports; and electrical connectors to attach to current or voltage sources and electrical signal modulators for driving the modulators 12a-d, 18a-d.

The interferometer 102 in this example is used to provide path-to-polarization encoding. Light is input from a light source 156 into a first input waveguide 101 of the interferometer device. This first input waveguide 101 guides light input into an edge facet of the device into an 2×2 MMI splitter 114 with a splitting ratio of around 50/50. This MMI 114 splits the light into the two spatially separate interferometer paths 104 and 106. Each of the interferometer arm paths 104, 106 are substantially the same length and have substantially the same optical path length when the modulators are unbiased. Along each of the arm paths 104 and 106 are respective thermal optic phase modulators 118a and 118b, serially followed by silicon carrier depletion phase modulators 112a and 112b such that, for each arm, light travels from the MMI splitter 114 through one thermo-optic phase modulator 118a/118b, then through one silicon carrier depletion phase modulators 112a and 112b. The light output from the carrier depletion phase modulators 112a and 112b is input into a further MMI optical combiner 116 with two input waveguides and two output waveguides. The MMI combiner 116 is designed to, again, have splitting ratio of or near 50/50. The two output waveguides 109, 110 form at least part of the output arms 108 and 110. Upon the output arms 108 and 110 are located two further thermo-optic phase modulators 118c and 118d followed sequentially, in optical path, by two further silicon carrier depletion modulators 112c and 112d. The output from the silicon phase modulators 112c and 112d is along waveguides 108a and 110a.

These waveguides 108a and 110a guide the light into a two dimensional grating coupler 160 that redirects light from both waveguides 108a and 110a from a direction parallel to the plane of the device to a direction perpendicular to the plane of the device 102 and thus allowing an output optical fibre 162 to optically couple the said vertically directed light out of the device 102.

In this example all of the said components 101, 106, 114, 104, 118b, 118a, 112a, 112b, 116, 108, 110, 118c, 118d, 112d, 112c, 108a, 110a and 160 are integrated on the same planar device 102. The device 102 is an integrated optic device having buried silicon waveguide circuitry, wherein the connecting waveguides and MMI couplers have intrinsic silicon waveguide cores, having a waveguide cross section height of 200 nm and a nominal width of 500 nm. The width of the MMI waveguides are larger to excite the required higher order modes. The waveguide cores are surrounded by silicon dioxide under and over cladding layers. The thermo-optic phase modulators 118a-d and the silicon carrier depletion phase modulators 112a-d have a cross section and material makeup similar to that shown in FIGS. 2 and 3 respectively and described elsewhere herein.

Light is input into the input waveguide 101 from a light source 156. The output from the light source 156 is input into an intensity modulator 157 to create pulses. The output from the intensity modulator 157 is input, via a single mode optical fibre, into a single mode polarization controller 158, the output of which is coupled into optical fibre 159 which is in turn input into the interferometer device 102.

The output optical fibre 162 couples out the light from the two dimensional grating coupler 160 and in turn couples light into a further polarization controller 164. The output polarization controller 164 is coupled into a further optical fibre that is input into a 50:50 beam split at 168 of the receiving circuit 166.

The receiving circuit 166 comprises the said beam splitter 168 the output of which provides two optical paths that are directed to polarization controls 170a and 170b. The output of these said polarization controllers 170a and 170b is in turn each input into a respective polarization beam splitter 172a and 172b thus providing two orthogonal polarization output paths which are input into single photon detectors 174a to 174d.

The 50:50 beam splitter 168 is used to passively choose the measurement basis with one output arm of the beam splitter 168 going to polarization beam-splitter 172a to measure |0> and |1>, and one arm going to polarization beam-splitter 172b to measure |+> and |−>. The polarization controllers 170a and 170b are used to set the basis.

FIG. 9 shows a close up example of the two dimensional grating coupler 160 of FIG. 8 together with the input waveguides 108a and 110a. Here it can be seen in FIG. 9 that the waveguides 108a and 110a each provides a laterally diverging linear taper 108b, 110b that broadens the optical mode before it is input into the two dimensional grating coupler 160. However any waveguide to converter coupling may be used including non-linear tapers or no tapers at all. The two dimensional coupler 160 may be any suitable grating coupler. In this example the two dimensional grating coupler 160 is formed from a silicon core whereby holes are periodically etched into the grating coupler in a lattice/matrix type formation.

The principle of operation of this two dimensional grating coupler is to change the path encoding signals from the output wave guides 108 and 110 into a combined light signal that is vertically coupled out of the device 102. Waveguides 108a and 110a guide light with horizontal polarizations 176a/b. The waveguides are formed to input light into the grating coupler 160 at in-plan orientations 178a,b that are approximately 90 degrees to each other i.e. the electric fields of the modes in the waveguides 108a and 110a are orthogonal to each other. When the light signals from the waveguides 108a and 110a are combined at the two dimensional grating coupler and propagated out of the device in a direction 182 the combined signal has orthogonal polarisations 180a and 180b.

The grating coupler is further explained below. A grating coupler is a device use to transmit light from the waveguide to an optical mode outside the device (either free space, or for fibre coupling). A typical grating coupler may use a periodic ridge grating in the waveguide to cause the mode to propagate upwardly out of the device. By designing the grating in a particular shape a Gaussian shaped single-mode can be produced and coupled efficiently into an optical fibre.

Grating couplers can maintain polarization of the output mode, for example, if the mode is TE in the waveguides 108a, 110a it can be converted to a horizontal polarization out of the waveguide.

For the present example, the silicon core waveguides 108a and 110a are polarization maintaining, i.e. if the input light is TE polarized then the two output modes in the output arms 108, 110 of the MZI will also be TE.

However, if the two waveguides 108, 110 turn towards each other to have a 90 degree angle between them, then the grating coupler for each output arm 108, 110 would now be polarized in horizontal and vertical respectively. Because the grating couplers for each waveguide overlap spatially at a common location to provide a combined 2D grating coupler 160, then there is only one spatial mode, with a polarization encoded state equivalent to the path encoded state where |0> converts to |H>, |1> converts to |V>, and any arbitrary superposition.

A device 102 similar to that described above was set-up according to a similar set-up shown in FIG. 8. The TOPMs were designed in silicon-on-insulator using doped resistive heating in the waveguide slab. This design provides ohmic electrical characteristics (~6.14 k for a 150 m length) and a $2\pi$ voltage of ~24 V.

In addition to the components shown in FIG. 8, a quantum random number generator (not shown) output electrical signals to a pulse/pattern generator (not shown), which in turn input electrical drive signals to the phase modulators 112a-d. The pulse pattern generator was electrically connected to and synchronized with control system (not shown) driving the experiment and connected to the detectors 174a-d. A DC voltage source was connected to the phase modulators 112a-d and 118a-d where phase modulators 112a-d were also temperature controlled using temperature control means such as Peltier coolers and associated controllers.

The light source output a continuous wave light source with a wavelength of 1550 nm. The light output from intensity modulator had a 1.67 gigahertz clock rate.

The device 102 was calibrated by using the thermo-optic phase modulator 118a on the top arm 104 to bias the device 102 to equal intensity on either output arm 108, 110. The outputs were measured through optical taps added to the integrated circuit. The carrier depletion modulators 112a and 112b on the interferometer arms 104, 106 were then swept with DC voltages to find the |0> and |1> state voltages. These states were then sent through the receiver circuit 166 to align the first basis {|0>, |1>}.

The second basis was then aligned to ensure an equal probability of counts for both first two states, which was followed then by returning to the DC offset, and tuning the thermo-optic phase modulator 118c on output arm 108 until the results were also equal over the first and second basis, thus providing the DC phase state of |+i>.

Following this calibration DC sweeps could be taken on the final two carrier depletion modulators to find the voltage offsets for the |+> and |-> state. FIGS. 10a-d, illustrate final DC sweeps to verify the correct state preparation, and the final modulation parameters required. In FIGS. 10a-d: the Y-axis represents optical output in dB from the four outputs measured at 174a-d of FIG. 8, due to the respective carrier depletion phase modulator 112a-d; the X-axis represents voltage input to the respective carrier depletion phase modulator 112a-d.

Figures 10A, 10B, 10C, 10D:
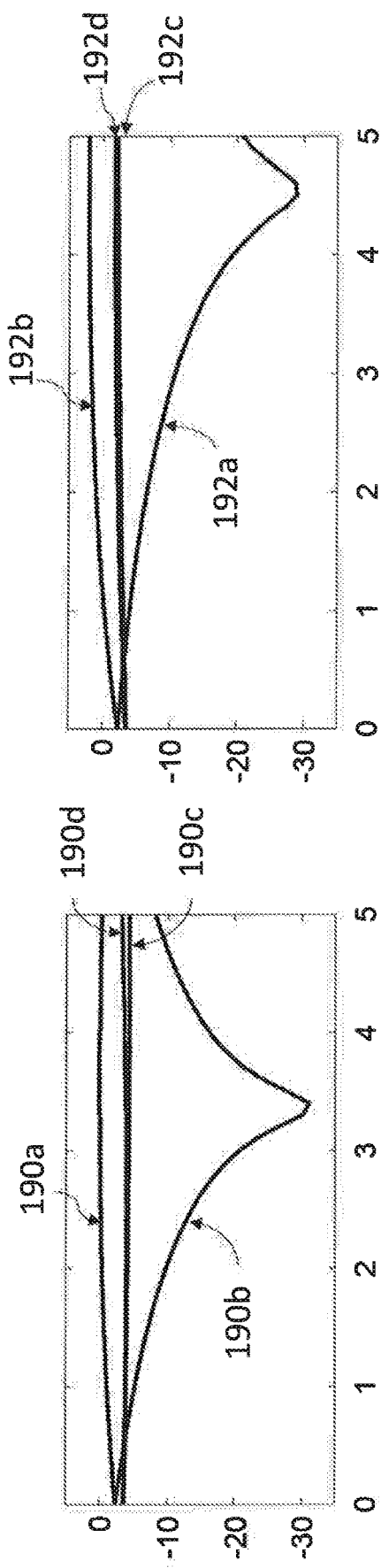

FIG. 10a shows the graph for preparing the |0> state by changing the voltage (hence phase) of carrier depletion modulator 112a, where the following references relate to the line for the following states:
|0>=reference 190a
|1>=reference 190b
|+>=reference 190c
|->=reference 190d FIG. 10b shows the graph for preparing the |1> state by changing the voltage (hence phase) of carrier depletion modulator 112b, where the following references relate to the line for the following states:
|0>=reference 192a
|1>=reference 192b
|+>=reference 192c
|->=reference 192d FIG. 10c shows the graph for preparing the |+> state by changing the voltage (hence phase) of carrier depletion modulator 112c, where the following references relate to the line for the following states:
|0>=reference 194a
|1>=reference 194b
|+>=reference 194c
|->=reference 194d FIG. 10d shows the graph for preparing the |-> state by changing the voltage (hence phase) of carrier depletion modulator 112d, where the following references relate to the line for the following states:
|0>=reference 196a
|1>=reference 196b
|+>=reference 196c
|->=reference 196d Data was then taken with a random set of input data to verify the state preparation of realistic data. FIG. 11a shows the ideal probabilities of preparation and measurement where the left horizontal axis lists the transmitted states and the right horizontal axis lists the received states and the vertical axis represents the probability. For example, when sending the |0> state, there is a 50% probability of measuring it as a |0>, a 0% probability of measuring it as a |1> and 25% probability of measuring it as either |+> or |->. FIG. 11b shows data taken from the above experimental setup described above. The experimental results show good agreement with the model and the taken data and produce an average QBER of 1.1%. This demonstrates the suitability of the techniques and components described for quantum key distribution, as it is well below error rate threshold calculated from security proofs.

Time Bin Encoding

FIG. 12 shows an example of an interferometer apparatus 2 embodied in this example as an unbalanced 2×2 Mach-Zehnder interferometer (MZI) device 202 where the two optical outputs form part of a further balanced 2×2 MZI where one of the output optical paths 211 from the latter balanced MZI is used as the quantum transmission channel. A balanced MZI, for any of the examples described herein, is one in which the optical path lengths of the first and second interferometer arm paths are substantially the same.

A schematic example of an interferometer apparatus 2 for time bin encoding is shown in FIG. 12. This figure comprises similar features as those described for FIG. 8, wherein the interferometer apparatus 2 is a transmitter device 202 and is shown in an experimental set up optically connected to a light source 56 and a receiver device 366. Other parts of the experimental set-up have omitted in this figure. Other parts of the experimental set-up may include similar further components as described in the set-up of the path-polarization example, such as, but not limited to: quantum random number generator for outputting electrical signals to a pulse/pattern generator, which in turn inputs electrical drive signals to the phase modulators 212a-d; a control system driving the experiment and connected to the detectors 314a,b; a DC voltage source connected to the phase modulators 212a-d and 218a-d and temperature controlling devices such as Peltier coolers and associated controllers for regulating the temperature of the carrier depletion modulators.

An input laser 256 is used to output laser light into an optical intensity modulator 257 (for example, an electroabsorption modulator) which creates pulses. The light source and intensity modulator 257 are configured to output each pulse to only have a probability of a single photon, thus the combination of source 257 and intensity modulator 257 may be referred to as a single photon source. Other single photon sources may be used in the alternative such as but not limited to a quantum dot source. The output from the intensity modulator 257 is input into a polarization controller 258.

The output of the polarization controller 258 is input into the device 202. The optical connections between any of the light source 256, the modulator 257, the polarization controller 258 and device 202 may be any optical connection, for example free space optical alignment; being integrated onto device 202; or for example being connected by optical fibres such as single mode optical fibres. The example shown in FIG. 12 uses a single mode optical fibre 259 to couple the output from the polarization controller 258 into the device 202. At the input facet of the chip 202 is at least an input waveguide 201 that directs light received from the optical fibre 259 into a first unbalanced Mach-Zehnder (MZI) configuration. Similar to FIG. 8, this Mach-Zehnder (MZI) configuration has an optical splitter 214, two optical arms 204 and 206 and an optical combiner 216. Again, similarly to FIG. 8, each optical arm 204 and 206 has a thermo-optic phase shifter 218a and 218b followed serially in optical path by respective separate silicon carry depletion phase modulators 212a and 212b. Before the optical paths 204 and 206 are connected to the optical combiner 218, one of the optical paths 206 comprises an optical delay line 205, whilst the other optical interferometer path 204 comprises a balanced Mach-Zehnder (MZI) interferometer 207.

The optical delay line 205 may be any suitable length to separate pulse states propagating along paths 204, 206 into consecutive time bins such that the portion of the pulse state traversing the optical path 204 is ahead in time of the sister pulse state propagating along path 206 when both optical states are input into the optical splitter 216. In this example the delay between the first and second optical paths 204 and 206 is 1.5 nanoseconds, although any suitable optical delay may be used. The optical delay path 205 may be formed using any suitable component including an integrated optical path having a buried waveguide within the same planar lightwave circuit as the other waveguides in the device 202. Extended lengths of optical paths, particularly integrated optical paths suffer from increased optical losses. Therefore in the other arm 204 of the device 202 another balance Mach-Zehnder (MZI) interferometer 207 is included to act as a variable loss component to balance the total loss of the pulses states along each arm 204 and 206. This balanced Mach-Zehnder (MZI) interferometer 207 has two input waveguides coupled to a 2×2 MMI splitter where one of the input waveguides is an output waveguide from phase modulator 212a. The splitter of the MZI 207 then splits light into two separate optical arm paths, wherein at least one has a thermo-optic phase shifter 209. The optical arm paths of this Mach-Zehnder (MZI) interferometer 207 then couple into an optical combiner which has two optical outputs wherein one of these optical outputs is input into the optical combiner 216. By adjusting the phase along one of the optical arms of the balanced Mach-Zehnder (MZI) interferometer 207, the amount of light that exits this interferometer 207 can be changed, hence balance the loss incurred from the optical delay line 205 on the other optical path 206. Other loss-balancing methods are available, such as the inclusion of a non-50:50 coupler replacing the 50:50 MMI (214 in FIG. 12), so as to route a greater portion of the signal in to path 206 that 204, so as to compensate for the loss and to provide equal intensity pulses at the inputs of the balanced MZI 207.

The device 202 also includes a further optical splitter/combiner 260 whereby the output paths 208 and 210 from the optical combiner 216 form the interferometer arm paths of a balance Mach-Zehnder (MZI) interferometer formed from 2×2 optical combiner 216, optical combiner 260 and arm paths 208, 210. Similarly to FIG. 8, each of the arms 208 and 210 of this balance Mach-Zehnder (MZI), also have one thermo-optic phase modulator 218c, 218d followed by one silicon carry depletion phase modulator 212c, 212d. The output of the last optical combiner 260 of the device 202 comprises two output optical waveguides wherein one output optical waveguide 211 is used for the output quantum channel. The light is output from the device 202 from this output optical waveguide 211 via an output optical fibre 262 which inputs light into a polarization controller 264 which in turn inputs the transmitted light into a receiver device 366.

In this example the receiver device 366 is similar to the transmitter device 202 except that light is input through the receiver device in the opposite direction, i.e. input through the balanced Mach-Zehnder (MZI) portion of the device 366 before going into the unbalanced Mach-Zehnder (MZI) portion of the device 366. The receiver device 366 is therefore matched to the transmitter device 202. Other receiver devices may also be used.

Similar to the transmitter device 202, the receiving device 366 has optical splitters/combiners 314, 316 and 360, thermo-optic phase modulators 318a to 318d, silicon carrier depletion modulators 312a-d, an input waveguide 301, a balance Mach-Zehnder (MZI) configuration 307 inside of the unbalanced Mach-Zehnder (MZI) portion and a delay line portion 305. The optical splitter/combiner 314 in device 366 has two optical output ports which direct light to a first and a second detector 314a and 314b. The detectors may be integrated with the device 366 or may be externally coupled to the device 366. Other types of detecting device may also be used.

In principle, the transmitter device 211 (and equivalently the receiver device 366) may be operated by inputting a pulse state into the output port 211 and having the quantum channel defined by the pulses states exiting the nominal input port 201.

Time Bin Operation

FIGS. 13a-d show examples of generating the four states for the BB84 protocol using the transmitter device 202. In each of the FIGS. 13a-d, each of the different BB84 output states 213 was defined by two pulses states in consecutive time bins. The time bins were defined by the time delay introduced by the optical path 205.

Figure 13A:
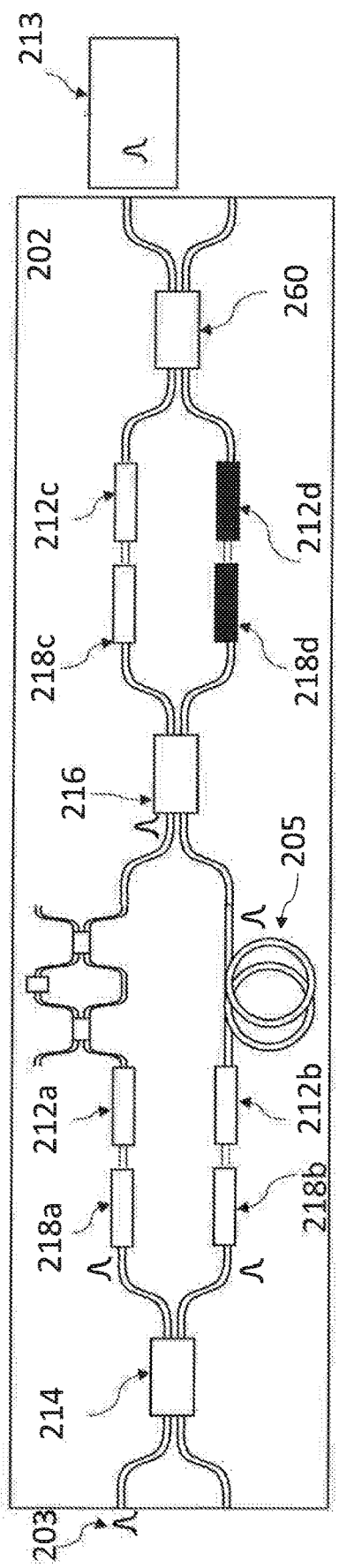
Figure 13B:
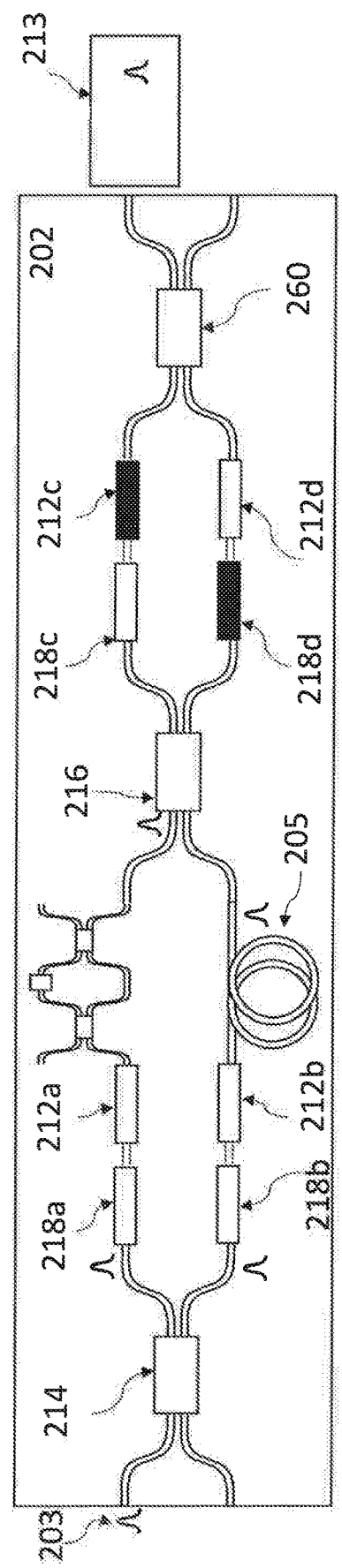

FIGS. 13a and 13b show how the transmitter device 202 was used to generate, respectively, two BB84 states of a single basis set. This basis set was based on one optical pulse state having negligible photon probability amplitude in one bin whilst the other bin having non negligible photon probability amplitude. In both FIGS. 13a and 13b, a single pulse state 203 was input into the device 202 whereby the splitter 214 divided the pulses state into equal probability pulse states in each arm. One arm introduced an optical delay to its respective pulse state by virtue of the optical delay line 205 so that the pulse states on the different UMZI arms were temporally separated when arriving at the 2×2 splitter/combiner 216. The balanced MZI in the other arm of the UMZI was tuned so that the two pulse states propagating along the UMZI arm paths entering the splitter 216 were substantially the same in amplitude. The splitter/combiner 216 then split each of the delayed and undelayed pulse states into two further equal amplitude sub-pulse states which were interfered at the final 2×2 splitter combiner 260 wherein one of the output paths of the combiner 260 was used to define the quantum channel upon which the actual BB84 state was sent. The thermo-optic phase shifter 218d was biased to the phase position on the Bloch sphere of |+i>. By introducing a phase change in either of silicon carrier depletion phase modulator 212c or 212d, one of the delayed and undelayed pulse states was output into the quantum channel whilst the other was output on the other (non-used) output channel. In FIGS. 13a and 13b, the phase modulators activated to provide the output states are shown with black boxes where FIG. 13a uses silicon carrier depletion phase modulator 212d to output the delayed pulse state onto the quantum channel whereas FIG. 13b uses silicon carrier depletion phase modulator 212c to output the undelayed pulse state onto the quantum channel. Both FIGS. 13a and 13b used thermo-optic phase modulator 218d to provide the phase position on the Bloch sphere of |+i>, however phase modulator 218c may also be used in addition or in the alternative. Furthermore, the phase modulators 212c and 212d may be used to output the other state in another example if the interferometer was phase biased differently.

FIGS. 13c and 13d show how the transmitter device 202 was used to generate, respectively, two BB84 states of a further single basis set. This basis set was based on both bins having substantially similar photon probability amplitudes. In both FIGS. 13c and 13d, a single pulse state 203 was input into the device 202 whereby the splitter 214 divided the pulses state into equal probability pulse states in each arm. One arm introduced an optical delay to its respective pulse state by virtue of the optical delay line 205 so that the pulse states on the different UMZI arms were temporally separated when arriving at the 2×2 splitter/combiner 216. The balanced MZI in the other arm of the UMZI was tuned so that the two pulse states propagating along the UMZI arm paths entering the splitter 216 were substantially the same in amplitude. The splitter/combiner 216 then split each of the delayed and undelayed pulse states into two further equal amplitude sub-pulse states which were interfered at the final 2×2 splitter combiner 260 wherein one of the output paths of the combiner 260 was used to define the quantum channel upon which the actual BB84 state was sent. The thermo-optic phase shifter 218d was biased to the phase position on the Bloch sphere of |+i> however phase modulator 218c may also be used in addition or in the alternative. By setting the phase of the thermo-optic phase shifter 218d to the phase position on the Bloch sphere of |+i>, the final balanced MZI portion of the device was set to receive a single input pulse state into splitter 216 and output from the splitter 260 sub output pulses states having substantially the same probability amplitude.

Furthermore, one (or both) of the thermo-optic phase shifters 218a, 218b in the UMZI portion was biased so that the nominal phase difference between the delayed/undelayed pulse states entering the splitter 216 was at the the phase position on the Bloch sphere of |+i> (plus the delay given by the delay line 205).

By introducing a phase change in either of silicon carrier depletion phase modulator 212a or 212b, one of the delayed and undelayed pulse states was output into the quantum channel with a phase change $\Delta\varphi$ whilst the other was output onto the same quantum channel without the phase change. Because the latter balanced MZI portion in the device 202 was phase biased to output pulses from both output arms (one being the quantum channel), the probability amplitudes of the pulse states entering the splitter 216 were split between the quantum channel and the unused sister output channel.

To generate and receive the basis states using the set-up shown in FIG. 12, electronic controllers, current/voltage supplies and other associated experimental devices were used, including, but not limited to other devices described elsewhere herein. In particular, Quantum random numbers (QRN) were pre-loaded to a pulse/pattern generator (not shown) to modulate the carrier depletion modulators 212a-d. DC voltage biases were applied to the thermo-optic modulators 218a-d and to the carrier depletion modulators 212a-d through bias tees (not shown).

The carrier depletion modulators were nominally left at 0 V bias, and the thermo-optic phase modulator 209 (and the equivalent in the receiver device 366) was biased so as to balance the loss of the delay lines 205/305.

Temperature controllers were used to maintain a temperature stability of 0.01° on both the transmitter and receiver devices 202, 366. Temperature fluctuations in general affect the refractive index of the silicon waveguides, and even with the temperature control, ultimately was one of the limiting factors of the QBER achievable in this experimental implementation.

FIG. 14a illustrates a histogram of the state generation output from the transmitter device 202 but before the receiver device 366. FIGS. 14b and 14c show the measurement outcomes of the receiver from the single photon detectors. The outcomes gave and QBER of 2.1%.

Detectors

Any of the detectors used in the apparatus 2 described herein may be any one or more detector devices in principle that can detect single photons by converting the photon energy into electrical energy that can be monitored by electrical monitoring equipment. The detectors preferably comprise a semiconductor material used to absorb the photons, for example Indium Gallium Arsenide (InGaAs). The detectors are preferably able to detect photons at GHz pulse rates and can absorb the wavelengths of the light used by the sources described herein (for example the C-band wavelength spectrum). Examples of photon detectors include InGaAs avalanche photodiodes with gated operation and self-differencing scheme, or niobium nitride superconducting nanowire single photon detectors.

In order to address various issues and advance the art, the entirety of this disclosure shows by way of illustration various embodiments in which the claimed invention(s) may be practiced and provide for superior Optical interferometer apparatus and method. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. An optical interferometer apparatus for generating at least a first and a second state for each of at least two different quantum cryptographic basis sets, the apparatus comprising:
   at least a first and a second interferometer arm path that are spatially separate from each other; and,
   at least a first and a second interferometer optical output path that are spatially separate from each other;
   wherein each of:
      the first and second interferometer arm paths; and
      the first and second interferometer optical output paths;
   comprises a controllable phase modulator, of a first type, configured to controllably change a phase of light propagating along a respective path;
   wherein at least one of the first or second interferometer arm paths comprises a further controllable phase modulator, of a second type, wherein the first type of controllable phase modulator imparts a phase change using a different physical effect than the second type of controllable phase modulator; and
   wherein an output from the controllable phase modulators of the first and second interferometer optical output paths are used together for defining each of the first and second states for each respective basis set.

2. The optical interferometer apparatus as claimed in claim 1 wherein at least one of the controllable phase modulator, of the first type, comprises a carrier depletion phase modulator.

3. The optical interferometer apparatus as claimed in claim 1 wherein the first type of controllable phase modulator is configured to impart a phase change based on refractive index changes arising from carrier manipulation.

4. The optical interferometer apparatus as claimed in claim 1 wherein the second type of controllable phase modulator is configured to impart a phase change with substantially no loss or gain in an optical signal propagating through the modulator as the refractive index of the controllable phase modulator is changed through its range of operation.

5. The optical interferometer apparatus as claimed in claim 4 wherein the second type of controllable phase modulator comprises a thermo-optic phase modulator.

6. The optical interferometer apparatus as claimed in claim 1 wherein the optical interferometer comprises an integrated optic interferometer.

7. The optical interferometer apparatus as claimed in claim 1 wherein the optical path lengths of the first and second interferometer arm paths are the same.

8. The optical interferometer apparatus wherein the further controllable phase modulator comprises a thermo-optic controllable phase modulator.

9. The optical interferometer apparatus as claimed in claim 8 comprising:
   an optical splitter configured to:
   receive input light; and,
   output the received input light upon the first interferometer arm path and the second interferometer arm path,
      an optical combiner configured to:
         receive light from any of the first and second interferometer arm paths output light upon the first and second interferometer optical output paths.

10. The optical interferometer apparatus as claimed in claim 8 wherein the said controllable silicon carrier depletion phase modulators comprise controllable silicon integrated optic carrier depletion phase modulator having a length, along the direction of optical propagation, between 0.5 millimeter (mm)-5 mm.

11. The optical interferometer apparatus as claimed in claim 10 wherein the said controllable silicon integrated optic carrier depletion phase modulators in each of the said paths have a speed of 100 Kilohertz (kHz)-50 GigaHertz (GHz).

12. The optical interferometer apparatus as claimed in claim 11 wherein the said controllable silicon integrated optic carrier depletion phase modulators in each of the interferometer arm paths and interferometer optical output paths have a speed of 100 Megahertz (MHz)-15 Gigahertz (GHz).

13. The optical interferometer apparatus as claimed in claim 1 wherein the first and second interferometer optical output paths are input into a polarisation rotator combiner.

14. The optical interferometer apparatus as claimed in claim 13 where the polarisation rotator combiner is configured to: receive light from the first and second interferometer optical output paths in a first plane; and, output the light in a direction out of the said plane.

15. The optical interferometer apparatus as claimed in claim 8 wherein:
   A) the first and second interferometer optical output paths are input into a second optical combiner; and
   B) the apparatus is configured such that the first interferometer arm path is longer than the second interferometer arm path.

16. The optical interferometer apparatus as claimed in claim 15 wherein the shorter of the said paths comprises a controllable optical attenuator.

17. A method of operating the optical interferometer apparatus, as claimed in claim 8, the method comprising the steps of:
   generating a first state of a quantum cryptographic protocol by:
      sending a first control signal to change the phase of the thermo-optic controllable phase modulator for a first time period; and, sending a second control signal to change the phase of at least one of the controllable silicon carrier depletion phase modulators for a second time period, the second time period being shorter in duration than the first time period.

18. The method as claimed in claim 17, comprising the steps of:

generating a second state of the quantum cryptographic protocol by sending, after the second time period a control signal to change the phase of one of the controllable silicon carrier depletion phase modulators for a third time period, the third time period ending on or before the end of the first time period.

19. The method as claimed in claim 18 wherein the second and third control signals are sent to any of:

A) the controllable silicon carrier depletion phase modulators in the interferometer arms paths for outputting respective first and second states of a first basis set; and B) the controllable silicon carrier depletion phase modulators in the interferometer optical output paths for outputting respective first and second states of a second basis set.

20. The method as claimed in claim 17 wherein the said control signals are configured to adjust the phase of the respective controllable silicon carrier depletion phase modulator by a value between $9\pi/20$ up to but not including $\pi/2$.

* * * * *